(12) United States Patent
Readman

(10) Patent No.: US 10,865,928 B2
(45) Date of Patent: Dec. 15, 2020

(54) FLUID COUPLING

(71) Applicant: SELF ENERGISING COUPLING COMPANY LIMITED, Northwich Cheshire (GB)

(72) Inventor: Matt Readman, Northwich (GB)

(73) Assignee: SELF ENERGISING COUPLING COMPANY LIMITED, Northwich Cheshire (GB)

( * ) Notice: Subject to any disclaimer, the term of this patent is extended or adjusted under 35 U.S.C. 154(b) by 81 days.

(21) Appl. No.: 16/092,484

(22) PCT Filed: Apr. 11, 2017

(86) PCT No.: PCT/GB2017/051014
§ 371 (c)(1),
(2) Date: Oct. 10, 2018

(87) PCT Pub. No.: WO2017/178813
PCT Pub. Date: Oct. 19, 2017

(65) Prior Publication Data
US 2019/0128457 A1 May 2, 2019

(30) Foreign Application Priority Data
Apr. 11, 2016 (GB) .................... 1606136.8

(51) Int. Cl.
*F16L 37/35* (2006.01)
*F16L 37/12* (2006.01)

(52) U.S. Cl.
CPC .............. *F16L 37/35* (2013.01); *F16L 37/12* (2013.01); *F16L 37/122* (2013.01)

(58) Field of Classification Search
CPC . F16L 37/32; F16L 37/35; F16L 37/12; F16L 37/122; F16L 37/123
See application file for complete search history.

(56) References Cited

U.S. PATENT DOCUMENTS 2,509,444 A * 5/1950 Mitchell ................. F16L 37/35
137/614.04
2,770,474 A * 11/1956 Krapp ..................... F16L 37/40
251/149.6
(Continued)

FOREIGN PATENT DOCUMENTS

EP 2 348 242 A1 7/2011
EP 2505899 A1 3/2012
(Continued)

OTHER PUBLICATIONS

International Search Report for PCT/GB2017/051014, dated Jul. 3, 2017.

*Primary Examiner* — David Colon-Morales
(74) *Attorney, Agent, or Firm* — Shumaker, Loop & Kendrick, LLP

(57) ABSTRACT

A valve assembly including a probe having a first fluid exit; a socket for receiving the probe and having a second fluid exit. The probe and socket are moveable along a coupling axis to open and close the valve assembly. The valve assembly includes a closing member arranged relative to one of the fluid exits and so as to move between an open position and a closed position, wherein in the open position, the closing member does not obstruct said fluid exit and in the closed position, the closing member seals said exit, and a securing means is arranged to secure and release the closing member relative to the probe or socket of the other exit. The movement of the securing means is controlled by a cam and follower arrangement.

12 Claims, 23 Drawing Sheets

(56) References Cited

U.S. PATENT DOCUMENTS

| | | | | |
|---|---|---|---|---|
| 3,897,091 A * | 7/1975 | McMath | | F16L 37/20 285/311 |
| 4,458,719 A * | 7/1984 | Strybel | | F16L 37/127 137/614.03 |
| 5,385,169 A * | 1/1995 | Odelius | | F16L 37/35 137/614.03 |
| 5,439,258 A * | 8/1995 | Yates | | F16L 37/12 285/313 |
| 5,483,993 A | 1/1996 | Roebelen, Jr. | | |
| 5,740,835 A * | 4/1998 | Murphy | | F16K 15/20 137/614.03 |
| 5,984,265 A * | 11/1999 | Engdahl | | F16L 37/42 251/148 |
| 6,679,472 B2 * | 1/2004 | Baugh | | E21B 33/038 166/86.3 |
| 7,073,773 B2 * | 7/2006 | Nuttall | | F16L 37/0848 137/614.03 |
| 8,387,949 B2 * | 3/2013 | Ekstrom | | F16L 37/35 251/149.6 |
| 8,757,589 B2 * | 6/2014 | Readman | | F16L 37/38 251/149.1 |
| 9,194,524 B2 * | 11/2015 | Konishi | | F16L 37/36 |
| 9,528,648 B2 * | 12/2016 | Nanaji | | B67D 7/3218 |
| 10,094,501 B2 * | 10/2018 | Bull | | E21B 33/038 |
| 2004/0074241 A1 * | 4/2004 | Bishop | | F17C 3/005 62/53.1 |
| 2017/0328164 A1 * | 11/2017 | Partridge | | F16L 1/26 |

FOREIGN PATENT DOCUMENTS

| | | |
|---|---|---|
| GB | 1002559 | 8/1965 |
| GB | 2530532 A | 9/2014 |
| WO | 2007/001677 A2 | 1/2007 |
| WO | 2007/001677 A3 | 1/2007 |
| WO | 2007017677 A1 | 2/2007 |
| WO | 2008/087457 A1 | 7/2008 |
| WO | 2010/150027 A1 | 12/2010 |

* cited by examiner

FLUID COUPLING

FIELD

The present invention relates to a valve assembly and in particular, although not limited to, a valve assembly for opening and closing the end of fluid passageways. The present invention further extends to a method of opening and closing a valve assembly.

BACKGROUND

It is a common requirement in many industries to be able to open and close the ends of fluid passageways. Fluid passageways require opening and closing in a variety of circumstances, for instance before/after the coupling/decoupling of two fluid passageways (e.g. pipes or hoses). It is particularly desirable to combine the opening and closing of the valves with coupling and decoupling of the two fluid passageways, such that when the fluid passageways are decoupled the valves are closed and when the fluid passageways are coupled the valves are opened.

In applications where one or both of the fluid passageways contain pressurised fluid (e.g. during so-called "hot make" or "hot break" conditions), large separation forces may be exerted. Suitably, securing means may be provided to secure together those parts on which the separation forces act and to carry these separation forces during coupling and uncoupling.

WO2008087457 discloses a coupling with shut-off valves suitable for coupling and decoupling high pressure pipelines. The valve assembly comprises male and female coupling members that are connectable by inserting a probe of the male member into a socket of the female member. A fluid passageway within the female member has an aperture within the socket that is open and closed by a first closing member that moves within the socket. A fluid passageway within the male member has an aperture on the probe that is open and closed by a second closing member. When mated fluid flows between the two fluid passageways.

In the international patent application WO 2008087457 A1, a particular example of a hot break securing means is described in the form of a clam-shaped cage. The cage is arranged such that coupling of two coupling members causes the cage to close and thus secure the coupling members together, while uncoupling causes the cage to open and thus release the coupling members. In order to open the cage, the coupling member which is withdrawn from the cage forms a pair of ramp-like features arranged to cause the cage to open during uncoupling. The ramp-like features are arranged in an arrowhead configuration, causing the clam-shaped cage to be forced open as the coupling members are uncoupled.

Notably, the clam-shaped cage engages the arrowhead configuration to secure the coupling assembly. The arrowhead configuration, therefore, is arranged to be retained by the cage against separation forces acting along the coupling axis as well as arranged to cause the opening of the cage along an axis perpendicular to the coupling axis. In order to achieve both these purposes, the chamfered shoulders of the arrowhead configuration are at an angle to these both axes. This, however, increases a strain on the cage which may, after repeated uncoupling, lead to a deformation of the cage which may affect operation of the coupling assembly.

During insertion of the probe into the socket, the first cage releasably locks the first closing member to the probe such that the cage carries any separation forces created due to the pressure of the fluid within the passageways. The female member may also include a second cage that locks the socket to the second closing member in order to carry the separation forces created between the socket and second closing member. Accordingly, the coupling may be coupled and decoupled even when high pressure fluid is within the fluid passageways.

Although such a coupling has been utilised for large diameters, scaling down the coupling for use with small diameters has proved problematic due to the forces created on the cages. That is, because the cages interact with the respective parts at a chamfer in order to initiate the opening of the cages as the parts are decoupled, the fluid pressure creates a bending moment on the cages that causes the cages to attempt to deform or bend. Due to the tolerances of the moving parts and the requirement for the parts to seal in use, any bending of the cages can lead to the coupling jamming thereby preventing the decoupling of the parts. Although the cages can be engineered to withstand the forces, for instance by making the cages more robust, the bending forces has prevented the coupling from being scaled down.

It is an object of the present invention to attempt to overcome at least one of the above or other disadvantages. It is a further aim to provide an improved coupling or valve assembly that reduces the risk of the components jamming and therefore preventing decoupling.

SUMMARY

According to the present invention there is provided an apparatus as set forth in the appended claims. Other features of the invention will be apparent from the dependent claims, and the description which follows.

There is provided a valve assembly wherein movement of a first securing means is guided by a cam and follower arrangement in order to secure and release a probe or socket relative to a closing member of the other of the probe or socket. For instance, in a cam and follower arrangement, the follower rides in a slot to control the movement. The probe and socket being coupled by relative movement in a coupling direction. Suitably, the probe and socket each include a fluid passageway that is mated in use when the probe is fully inserted into the socket. Here, the fluid passageway in the probe has an exit on a circumferential face of the probe and the fluid passageway in the socket has an exit on a circumferential face of the socket. The closing member closes one of the apertures. In use, the securing means is able to secure the closing member in order to restrict relative movement of the closing member and part.

In the exemplary embodiments, the follower is formed on or as part of the securing means. The cam is formed as a slot that is fixed relative to the socket. The shape of the slot defines the movement of the follower and therefore the securing means. Consequently, the movement of the securing means in a direction transverse the coupling direction to open and close the securing means to release and secure the respective parts is separated from the movement of the parts. Thus the securing means can engage the respective parts orthogonal to the separation direction thereby avoiding bending moments and reducing the risks of the parts jamming. That is one of the surfaces that abut between the securing means and part is orthogonal to the coupling direction. In the exemplary embodiments, the securing means includes an arcuate face to abut the orthogonal part of the face. But this arrangement could be reversed.

In the exemplary embodiments, the securing means are pivotally connected to one of the parts. Here, the securing means secures and releases the respective part by relative pivotal movement. It will be appreciated that the pivotal movement is constrained and controlled by the cam and follower arrangement. Whilst the pivotal movement is isolated from the movement of the parts, coupling and decoupling of the probe and socket initiate movement of the cam and follower. In the exemplary embodiments, the securing means are pivotally connected to a part caused to move relative to the socket as the probe is moved relative to the socket. Here, abutment of the probe with the first closing member or abutment of the second closing member and socket prevents relative movement of said parts, but wherein continued relative movement of the probe and socket causes the follower to move relative to the cam.

In exemplary embodiments, the probe and socket are each opened and closed by a closing member and movement of second securing means is guided by a cam and follower arrangement in order to secure and release the probe or socket to a closing member of the other of the probe or socket. The cam and follower of the first closing means and the cam and follower of the second closing means may be separate or, the first and second closing means may be linked so that one cam and follower controls the opening and closing of both securing means. In the exemplary embodiments, the first and second securing means are linked by a sliding joint. Here, as the probe is inserted into the socket, the probe's closing member abuts the socket and the probe abuts the socket's closing member. Further relative movement of the probe and socket causes the socket's closing member to move relative to the socket. This causes the securing means pivotally attached to the socket's closing member to move relative to the socket and therefore the follower relative to the cam. It will be appreciated that seals arranged to seal fluid within the passageways are arranged to keep the apertures closed until the cam and follower have moved along a first portion of the cam that moves the follower transverse the coupling direction in order to secure the parts. Once secured, the securing means lock the respective parts so that further transitioning of the seals across the fluid apertures is undertaken with the respective parts acting as a single part wherein the separation forces are carried by the securing means. Further movement of the probe and socket relative to each other is accommodated by the follower moving within a second part of the cam. Suitably, the second part of the cam is substantially parallel to the coupling direction.

In the exemplary embodiments, although the first part of the cam closes both securing means, the link between the securing means allows the two securing means to move relative to each other in the coupling direction. To ensure the timing of the valve and that relative movement of the probe and socket triggers the cam and follower to move relative to each other in order to initiate the securing action only when the probe and socket are properly abutted, the friction preventing movement of the probe's closing member is suitably greater than any seal resistance between the probe and socket. In the exemplary embodiments, the resistance to the probe's closing member moving relative to the probe is suitably seal friction. However, in exemplary embodiment, the probe and respective closing member are held together by a retaining mechanism. The retaining mechanism applies a bias to resist relative movement of the probe and closing member. Here, the bias must be overcome before the closing member moves relative to the probe. Suitably, the bias may be a resilient member. The resilient member is arranged to act on a peg that operates between the probe and closing member to resist relative movement. The peg is arranged to move when the probe and closing member move relative to each other. The resilient member is arranged to prevent said movement. Consequently the system can be arranged so that the bias of the resilient member must be overcome before the probe moves relative to the probe's closing member.

In a first aspect there is provided a female member which, with a male member, forms the valve assembly.

The male member includes the probe with at least one first fluid passageway, wherein the or each fluid passageway has at least one exit aperture on a side face of the probe.

The female member includes the socket for receiving the probe of the male member, at least one second fluid passageway wherein the or each fluid passageway has at least one exit aperture arranged on an internal side face of the socket.

Preferably the valve assembly may be opened and closed by coupling the male and female members. During coupling the socket may receive the probe by relative movement along a first direction. The members may be decoupled by relative movement along a second direction, the second direction being opposed to the first. Insertion of the probe into the socket may cause the first closing member to move towards its open position. The first closing member may be caused to move towards its open position by abutment between the probe and the closing member. The abutment may be between distal ends of the probe and closing member.

Preferably during coupling the first securing means may restrict relative movement between the first closing member and probe before the or each exit aperture of the socket is opened. Additionally, during de-coupling the first securing means may restrict relative movement between the first closing member and probe until after the or each exit aperture of the socket is closed. The first securing means restricts the relative movement such that it carries any separation forces generated during coupling or de-coupling. Preferably the first securing means restricts the first closing member from moving relatively away from the probe. The first aspect thereby enables the male and female members to be coupled and de-coupled without generating a net separation force even when both the or each first and second fluid passages contain pressurised fluid.

Preferably the movement of the first closing member towards the open position may cause the first securing means to engage the probe. Additionally movement of the first closing member towards the closed position may cause the first securing means to disengage the probe. The first securing means may comprise two parts wherein at least one of the parts is pivotal towards or away from the other in order to engage and disengage the probe. Preferably both parts may be pivotally moveable towards and away from each other.

Preferably the pivot axis of the first securing means is locked fast with respect to the first closing member. Accordingly as the closing member is caused to move by insertion of the probe into the socket, the first securing means is caused to move with it.

Preferably the male member includes a second closing member arranged about the probe. The second closing member may be movable between an open position in which the or each exit aperture of the probe is at least partially unobstructed and a closed position in which the or each exit aperture of the probe is fully obstructed. The second closing member may be freely movable. Preferably the female member includes a second securing means for releasably securing the socket to the second closing member in order to restrict relative movement between said socket and second closing member. Preferably during coupling the second securing means may restrict relative movement between the second closing member and socket before the or each exit aperture of the probe is opened. Additionally, during de-coupling the second securing means may restrict relative movement between the second closing member and socket until after the or each exit aperture of the socket is closed. The second securing means may restrict the second closing member from moving relative to the socket such that the second closing member closes the or each aperture in the probe before the second securing means releases the second closing member and any forces that are generated by the coupling/decoupling of the members and that act to urge the second closing member away from the socket are carried by the second securing means. The second securing means may lock the second closing member to the socket. The first aspect thereby enables the male and female members to be coupled and de-coupled without any fluid within the or each first and second passageways being lost since the members cannot be decoupled without the first and second closing members being in their closed positions.

Preferably the second securing means may be caused to engage the second closing member by movement of the first securing means towards an engaged position. Additionally the second securing means may be caused to disengage the second closing member by movement of the first securing means away from the engaged position. The second securing means may be slidable relative to the first securing means. The second securing means may comprise two parts wherein at least one of the parts is pivotal towards and away from the other in order to engage and disengage the probe. Preferably both parts may be pivotally moveable towards and away from each other.

Preferably the pivot axis of the second securing means is locked fast with respect to the socket.

Preferably the female member and male member may comprise female and male coupling members respectively. The coupling members may be releasably interconnectable. When the two coupling members are coupled fluid may pass between the two fluid passages. The coupling members may be decoupled by withdrawing the probe from the socket. When the probe is inserted in the socket the or each exit aperture in the probe's side face may be coincident with the or each exit aperture in the socket's internal face.

Preferably each closing member may include two sealing rings such that, when in their closed positions the sealing rings create a seal on either side of each aperture. The seals on each closing member may be the same size such that, when coupled and pressurised, no net separation force is generated.

Preferably the female member may be substantially in accordance with that herein described and with reference to the figures. Preferably the male member may be substantially in accordance with that herein described and with reference to the figures.

According to a further aspect there is provided a female coupling member which, with a male coupling member (not itself part of this aspect), forms a valve assembly The female member being substantially the same as the female member according to the first aspect.

In the example embodiments a cage, which is arranged to carry separation forces, is closed and opened by a cam and follower arrangement. By constricting the opening and closing motion through the cam and follower arrangement, the cage can be opened and closed about a coupling member without relying on an oblique reaction force acting on the cage and the coupling member. In the exemplary embodiments, the cage and coupling member abut on a surface orthogonal to the coupling axis. The cage carries the separation forces in tension without the oblique reaction force.

According to an example, there is provided a coupling assembly having a female coupling member and a male coupling member. The female coupling member includes a securing member arranged to releasably secure the male coupling member. Suitably, the coupling assembly includes a follower and a track along which the follower is displaceable. Conveniently, displacing the follower along the track causes the securing member to move towards, i.e. secure, the male coupling member during coupling and, during uncoupling, causes the securing member to move away from, i.e. release, the male coupling member.

According to an exemplary embodiment, there is provided a valve assembly having a female coupling member and a male coupling member wherein: A valve assembly having a female coupling member and a male coupling member, the male member comprising: a probe, and a first fluid passageway having a first exit aperture on a side face of the probe; and the female coupling member comprising: a socket for receiving a probe of the male coupling member along a coupling axis, a second fluid passageway having a second exit aperture on an internal side face of the socket, a first closing member which is freely moveable between an open position in which the exit aperture of the socket is at least partially unobstructed and a closed position in which the exit aperture is fully obstructed, a first securing member which is pivotally connected to a first pivot moveable with the closing member and defining a first pivot axis; a first follower which is mounted to a first track and arranged to be displaced along the first track by the first securing member to cause the first securing member to pivot relative to the first closing member to releasably secure the first closing member to the probe such that the first closing member and the probe are restrained from moving relative to each other.

Preferably the valve assembly is opened and closed by coupling the male and female members. During coupling the socket may receive the probe by relative movement along a first direction. The members may be uncoupled by relative movement along a second direction, the second direction being opposed to the first. Insertion of the probe into the socket may cause the first closing member to move towards its open position. The first closing member may be caused to move towards its open position by abutment between the probe and the closing member. The abutment may be between distal ends of the probe and the closing member.

Preferably the movement of the first closing member towards the open position may cause the first securing member to engage the probe. Additionally movement of the first closing member towards the closed position may cause the first securing member to disengage the probe. The first securing member may comprise two parts wherein at least one of the parts is pivotal towards or away from the other in order to engage and disengage the probe. Preferably both parts may be pivotally moveable towards and away from each other. The two parts may be biased away from each other in order to be biased towards the disengaged arrangement. The two parts may be biased by an elastic member arranged between the two parts. The elastic member may be a spring. Alternatively, the two parts may be biased by a resilient member that is attached to the distal ends of the two parts. The resilient member may be a coil spring.

Preferably the pivot axis of the first securing means is locked fast with respect to the first closing member. Accordingly as the closing member is caused to move by insertion of the probe into the socket, the first securing means is caused to move with it.

Preferably the male member includes a second closing member arranged about the probe. The second closing member may be moveable between an open position in which the or each exit aperture of the probe is at least partially unobstructed and a closed position in which the or each exit aperture of the probe is fully obstructed. The second closing member may be freely moveable.

Preferably freely moveable means that the closing member is unbiased towards its closed position.

In some examples, the male coupling member includes a second closing member arranged about the probe, wherein the second closing member is movable between an open position in which the second exit aperture is at least partially unobstructed and a closed position in which the second exit aperture is fully obstructed.

Preferably the female member includes a second securing means for releasably securing the socket to the second closing member in order to restrict relative movement between said socket and second closing member. Preferably during coupling the second securing means may restrict relative movement between the second closing member and the socket before the or each exit aperture of the probe is opened.

Additionally, during uncoupling the second securing means may restrict relative movement between the second closing member and socket until after the or each exit aperture of the socket is closed. The securing means may restrict the second closing member from moving relative to the socket such that the second closing member closes the or each aperture in the probe before the second securing means releases the second closing member and any forces that are generated by the coupling/uncoupling of the members and that act to urge the second closing member away from the socket are carried by the second securing means. The second securing means may lock the second closing member to the socket. The exemplary embodiment thereby enables the male and female member to be coupled and uncoupled without fluid within the or each first and second passageways being lost since the member cannot be uncoupled without the first and second closing members being in their respective closed positions.

In some examples, the female coupling member comprises a second securing member which is pivotally connected to a second pivot defining a second pivot axis, and a second follower which is mounted to a second track and arranged to be displaced along the second track by the first securing member to cause the second securing member to pivot relative to the socket to releasably secure the socket to the second closing member such that the socket and the second closing member are restrained from moving relative to each other.

Preferably the second securing member is arranged inside the first securing member. Suitably, the second securing member may comprise the second follower and the second track may be formed on an internal side face of the first securing member. Alternatively, the first securing member may comprise the second follower and the second track may be formed on a side of the second securing member.

Preferably the second track comprises a straight section.

Preferably the second securing member may be caused to engage the second closing member by movement of the first securing member towards an engaged position. Additionally the second securing means may be cause to disengage the second closing member by movement of the first securing means away from the engaged position. The second securing means may be slidable relative to the first securing means. The second securing means may comprise two parts which are pivotal towards and away from each other. The two parts may be biased away from each other in order to be biased towards the disengaged arrangement. The two parts may be biased by the elastic member arranged to bias the first securing member.

Preferably the first track along which the first follower is displaceable comprises a plurality of sections. Displacement along a first section of the first track may bring the first securing member from an unlocked configuration into a locked configuration in which the first securing member is arranged to engage the probe. Suitably, displacement along the first section may cause the first securing member to pivot about the socket so that, during insertion of the probe, the first securing member may engage the probe. Displacement along a second section of the first track may cause the first securing member to follow the probe as the probe is being inserted farther into the socket. Suitably, displacement along the second section may cause the first securing member to shift parallel to the coupling axis. Conveniently, the first securing member remains in the locked configuration as it follows the probe.

In some examples, the first follower is displaceable along a first section of the first track to pivot the first securing member, and the first follower is displaceable along a second section of the first track to shift the first securing member parallel to the coupling axis.

Preferably the first track is arranged to form a V-shape. Suitably, the first section and the second section of the first track may meet at angle. Additionally, the first section and the second section may each be substantially straight. Conveniently, each section of the first track may have a length suitable for operation of the coupling assembly. Accordingly, the V-shape may not be symmetrical. It is also envisaged for sections of the first track to be arranged in other shapes, such as a C-shape.

In some examples, the first section of the first track and the second section of the first track are arranged in a V-shape.

Preferably the first securing member comprises the first follower. That is, the first follower may form part of the first securing member. Suitably, the track along which the first follower is displaceable is formed in a rigid structure being part of the female coupling member. Conveniently, the first track is formed in a housing of the female coupling member.

Preferably, the first track is extends along a plane which is perpendicular to the coupling axis.

Preferably the first track is formed in the housing or other rigid structure of the female member while the first follower is arranged on the first securing member. It is also envisaged for the first follower to be arranged on the housing or other rigid structure while the first track is formed in the first securing member.

In some examples, the first follower is located on the first securing member and the first track is formed in a housing of the female coupling member.

Preferably the first securing member extends between the pivot axis defined by the first pivot and a rotation axis defined by the first follower. The first securing member may thus be particularly suitable for withstanding forces exerted during coupling or uncoupling. Suitably, the first securing member may comprise a straight section extending continuously between the first pivot axis and the rotation axis. It is also envisaged that the first securing member may not be straight or continuous. In some cases, the first securing member may be neither straight nor continuous. For example, there may be additional portions making the first securing member not straight and/or there may be apertures so that the first securing member does not continuously extend between the pivot axis and the rotation axis.

Preferably the first securing member may be perpendicular to both the pivot axis and the rotation axis.

In some examples, the first securing member is arranged to occupy a space which extends between the first pivot axis and an axis of rotation defined by the first follower.

Preferably the second closing member is restricted to motion between the open configuration and the closed configuration. Suitably, the male coupling member may comprise a shaft arranged to restrict motion of the second closing member. Conveniently, the shaft may be arranged to restrict the second closing member to motion along one axis. Suitably, the second closing member may comprise the shaft, which may be mounted in a passage extending parallel to the coupling axis. Rotation of the closing member may thus be prevented, particularly where coupling is possible only in a limited number of orientations.

In some examples, the male coupling member comprises: a passage extending parallel to the coupling axis and is arranged to receive a shaft, the shaft arranged moveable with the second closing member and constrained to motion along the passage.

Preferably the shaft is arranged to restrict the second closing member to motion between two extremal positions. Suitably, the shaft may be hindered from fully leaving the passage. Conveniently, the open position may correspond to a first extremal position and the closed position may correspond to a second extremal position.

Preferably the valve assembly is arranged so that fluid trapped between the female coupling member and the male coupling member is drained through a drainage passageway during coupling. Suitably, a third fluid passageway may be provided. The third fluid passageway may have a third exit aperture in a distal end face of the second closure member, and the third fluid passageway may extend through the shaft. Fluid trapped during coupling between the distal end face of the second closure member and the female coupling member may thus flow into the third exit aperture and through the third fluid passageway. A suitable exit aperture may be provided to release said fluid.

In some examples, the male coupling member comprising a third fluid passageway which extends between an exit aperture in a distal end face of the second closure member and exit aperture in the shaft.

Preferably the shaft is arranged to prevent the second closure member from leaving the closed position in which the second exit aperture is fully obstructed. For example, the shaft and the passage may be arranged so that additional force is required to move the shaft past a certain point.

In some examples, the shaft is configured so that the second closure member is biased towards the closed position in which the second exit aperture is fully obstructed.

In some examples, the male coupling member comprises a projection on a distal end face of the probe; the female coupling member comprises a recess formed in a distal end face of the first closure member and arranged to receive the projection of the probe.

Preferably the valve assembly is arranged so that fluid trapped between the probe and the first closure member is drained through a drainage passageway during coupling. Suitably, a fourth fluid passageway may be provided. The fourth fluid passageway may have a fourth exit aperture in a distal end face of the first closure member, and the fourth fluid passageway may extend through the first closure member. Suitably, the fourth exit aperture may be formed in a distal end face of the first closure member. Conveniently, where a recess is provided in the first closure member the fourth exit aperture may be formed in the recess.

In some examples, the female coupling member comprises a fourth fluid passageway having a fourth exit aperture in the recess of the first closure member; the fourth fluid passageway extending through the first closure member.

Preferably the pivot axis of the second securing means is locked fast with respect to the socket. Accordingly as the probe is inserted into the socket the second closing member is caused to move towards its open position by abutment between the socket and closing member. Additionally as the probe is withdrawn from the socket, the second closing member is caused to move towards its closed position by the engagement of the second closing means.

Preferably the coupling members may be uncoupled by withdrawing the probe from the socket. When the probe is inserted in the socket the or each exit aperture in the probe's side face may be coincident with the or each exit aperture in the socket's internal face.

Preferably the female member may include alignment features to cooperate with features on the male member in order to ensure the correct alignment of the probe in the socket. The alignment features may include a protrusion and a corresponding slot in one of the male or female members respectively. The slot may be formed when an upper first securing member and a lower first securing member are brought into a closed configuration. The slot may extend between the upper and the lower first securing member. Suitably, the slot may be arranged to receive a projection of the male coupling member.

Preferably each closing member may include two sealing rings such that, when in their closed positions the sealing rings create a seal on either side of each aperture. The seals on each closing member may be the same size such that, when coupled and pressurized, no net separation force is generated.

When the male and female couplings include multiple fluid passageways, each passageway in the female member may include its own socket. Each socket may be closed by a closing member. Each closing member may be connected to the other so that the sockets are open and closed simultaneously. The male member may include a probe for each passageway. The probes may be connected to each other. A single closing member may close each of the probes.

Preferably the coupling members may be arranged such that the second closing member is returned to a distal end of the probe during uncoupling. Suitably, the second closing member comprises a latch arranged to resist uncoupling until the second closing member is returned to the distal end of the probe. During uncoupling, as the male coupling member is moved along the coupling axis, the latch may catch the female coupling member and thus resist uncoupling. Suitably, thereby the second closing member may be retained in position as the probe is withdrawn so that relative movement between the second closing member and probe is caused. Thereby the second closing member may be displaced to the distal end of the probe. Once the second closing member is returned to the distal end of the probe, the second closing member may be located in an extremal distal position relative to the probe. That is, the second closing member may be arranged to resist further displacement of the second closing member past the distal end of the probe. As such, the latch may be urged against the female coupling member with increasing force during uncoupling and eventually urged into a retracted configuration. Suitably, in the retracted configuration the second closing member is removable from the female coupling member.

The latch may be arranged to engage any suitable portion of the female coupling member. For example, the latch may be arranged to engage the second securing member. In other examples, the latch may be arranged to engage socket.

Conveniently, the latch is biased to return to the extended configuration, thus enabling convenient repeated coupling and decoupling. Any suitable biasing means may be used. For example, the latch may be sprung. In some examples, the latch may be mounted rotatable about a pivot axis, and a spring arranged to cause a rotation about the pivot axis.

In some examples, the second closing member comprises a latch which is moveable between an extended configuration and a retracted configuration, the latch being biased towards the extended configuration in which the latch is arranged to engage the female member during uncoupling, the latch being arranged to move to the retracted configuration as the second closing member is urged against the female member during uncoupling, and the second closing member being removable from the female member when the latch is in the retracted configuration.

In some examples, there is provided a female coupling member for use with a male coupling member, as described above.

According to an exemplary embodiment, there is provided a female coupling member for use with a male coupling member in a valve assembly, the female coupling member comprising: a socket for receiving a probe of said male coupling member along a coupling axis; a second fluid passageway having a second exit aperture on an internal side face of the socket; a first closing member which is freely moveable between an open position in which the second exit aperture is at least partially unobstructed and a closed position in which the second exit aperture is fully obstructed; a first securing member which is pivotally connected to a first pivot moveable with the closing member and defining a first pivot axis; a first follower which is mounted to a first track and arranged to be displaced along the first track to cause the first securing member to pivot relative to the first closing member.

Preferably the female coupling member includes any of the features described above in relation to the female coupling member as part of the valve assembly.

According to an exemplary embodiment, there is provided a male coupling member for use with a female coupling member in a valve assembly, the male coupling member comprising: a probe for insertion into a socket of said female coupling member along a coupling axis, and a first fluid passageway having a first exit aperture on a side face of the probe.

Preferably the male coupling member includes any of the features described above in relation to the male coupling member as part of the valve assembly.

According to an exemplary embodiment, there is provided a method of releasably interconnecting a female coupling member and a male coupling member of a coupling assembly. The method comprises: inserting a probe of the male member into a socket of the female member, the probe including a first fluid passageway having a first exit aperture on a side face of the socket, the socket including a second fluid passageway having a second exit aperture on an internal side face of the socket; displacing a first closing member which is moveable between an open position in which the first exit aperture is at least partially unobstructed and a closed position in which the exit aperture is fully obstructed; causing a displacement of a first securing member, the first securing member being pivotally connected to a first pivot moveable with the first closing member and defining a first pivot axis; and causing a follower mounted to a first track to be displaced along the first track to cause pivoting of the first securing member relative to the first closing member to releasably secure the first closing member to the probe such that the first closing member and the probe are restrained from moving relative to each other.

Preferably the method comprises causing a second securing means of the female member to releasably secure a second closing member of the male coupling member, said second closing member being moveable between an open position in which the or each exit aperture of the probe is at least partially unobstructed and a closed position in which the or each exit aperture is fully obstructed, to the socket when both the closing member are in closed positions.

Preferably the method comprises coupling the coupling members as herein described.

In some examples, there is provided a male coupling member for use with a female coupling member, as described above.

It will be appreciated that the various features described above and herein can be combined and used in isolation to provide the described effects.

BRIEF DESCRIPTION OF DRAWINGS

For a better understanding of the invention, and to show how embodiments of the same may be carried into effect, reference will now be made, by way of example, to the accompanying diagrammatic drawings in which.

DESCRIPTION OF EMBODIMENTS

Figure 1:
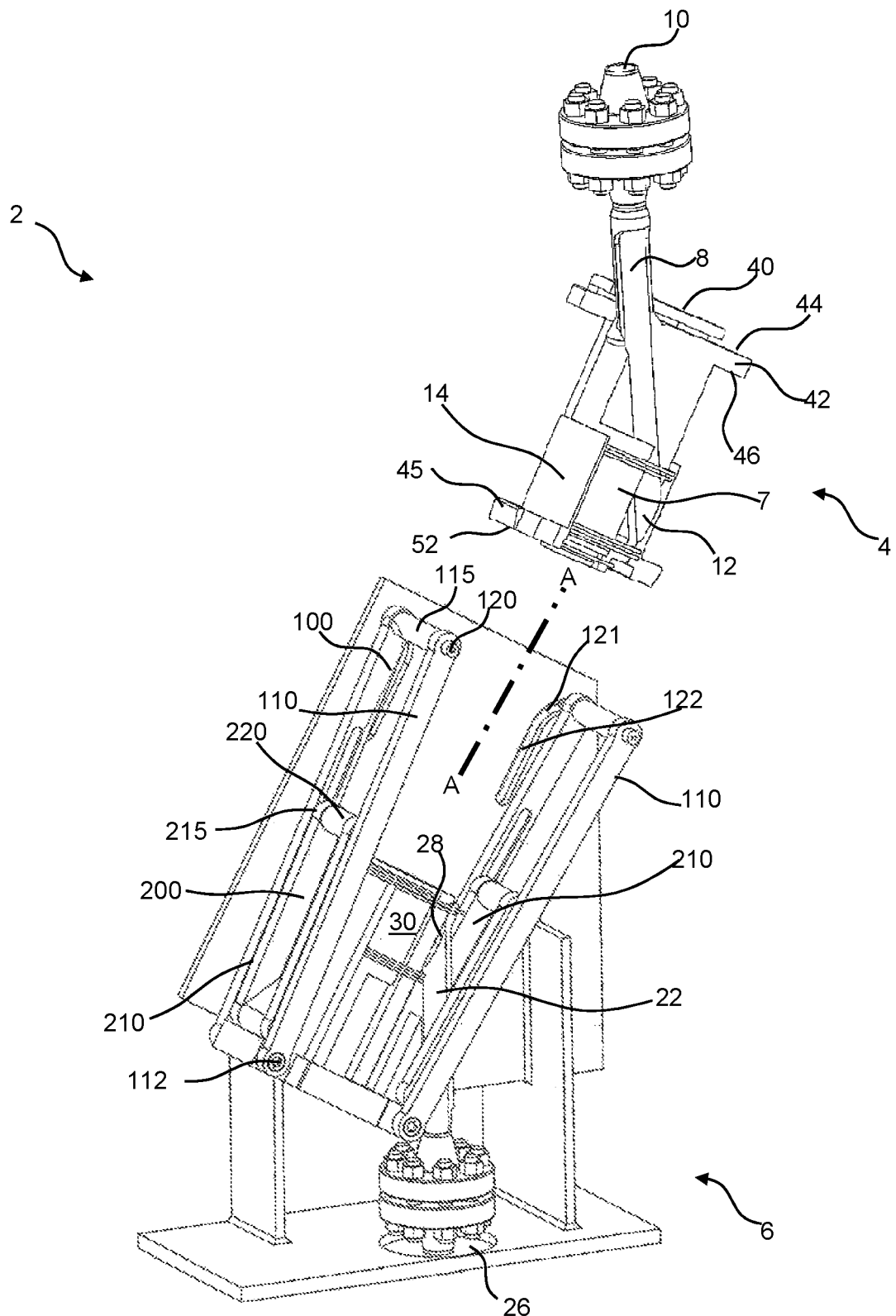
FIG. 1 is a view of a valve assembly according to an exemplary embodiment in an uncoupled or closed arrangement.

The background and general operation of the valve is explained in WO2008087457, the disclosure of which is hereby incorporated by reference, and a detailed explanation is therefore avoided. In brief, the FIG. 1 shows a valve assembly 2 in an uncoupled arrangement. The valve assembly 2 comprises a male member 4 and a female member 6.

A first exemplary embodiment is described with reference to FIGS. 1 to 6.

The male member 4 is of generally cylindrical overall form and includes a probe 7. A fluid passageway 8 extends through the probe between a first aperture 10, which is in communication with a first fluid conduit (not shown), and a second aperture 12, which is arranged on a circumferential face of the probe, at the other end to the first aperture 10. A cylindrical sheath 14 (shown partly cut away in FIG. 1) surrounds the probe and is slidably mounted thereto. The sheath 14 is unbiased and freely slidable between an open position, in which the sheath 14 does not restrict the second aperture 12, and a closed position (shown in FIG. 1), in which the sheath 14 restricts fluid egress from the aperture 12.

The female member 6 includes a body 16. The body defines a socket for receiving the probe 14. A fluid passageway 22 extends between a first aperture 26, which is in communication with a second fluid conduit (not shown), and a second aperture 28, which is arranged on an internal circumferential face of the socket, at the other end to the first aperture 26. A piston 30 is arranged to be slidably mounted within the socket. The piston is unbiased and free to slide between an open position, in which the piston 30 does not restrict the aperture 28, and a closed position, (shown in FIG. 1) in which the piston 30 restricts fluid egress from the aperture 28. First 100 and second 200 securing means are arranged as will be described in detail herein.

As shown in FIG. 1, when uncoupled the sheath and piston are in their closed positions. Accordingly, pressurized fluid may fill the fluid passageways, with the fluid being restricted from egressing the apertures 12 and 28, due to the sheath and piston being in the closed positions.

Figure 2:
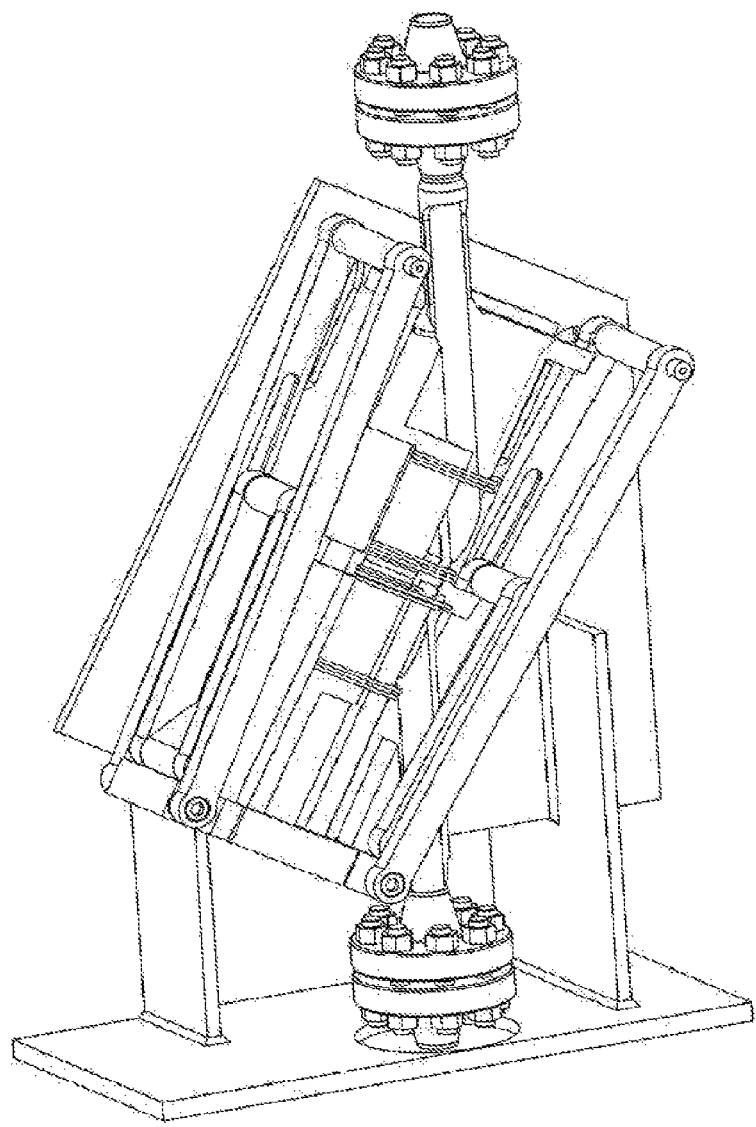
FIG. 2 is a view of the valve assembly of FIG. 1 in an initial coupling arrangement wherein the valve is closed.
Figure 3:
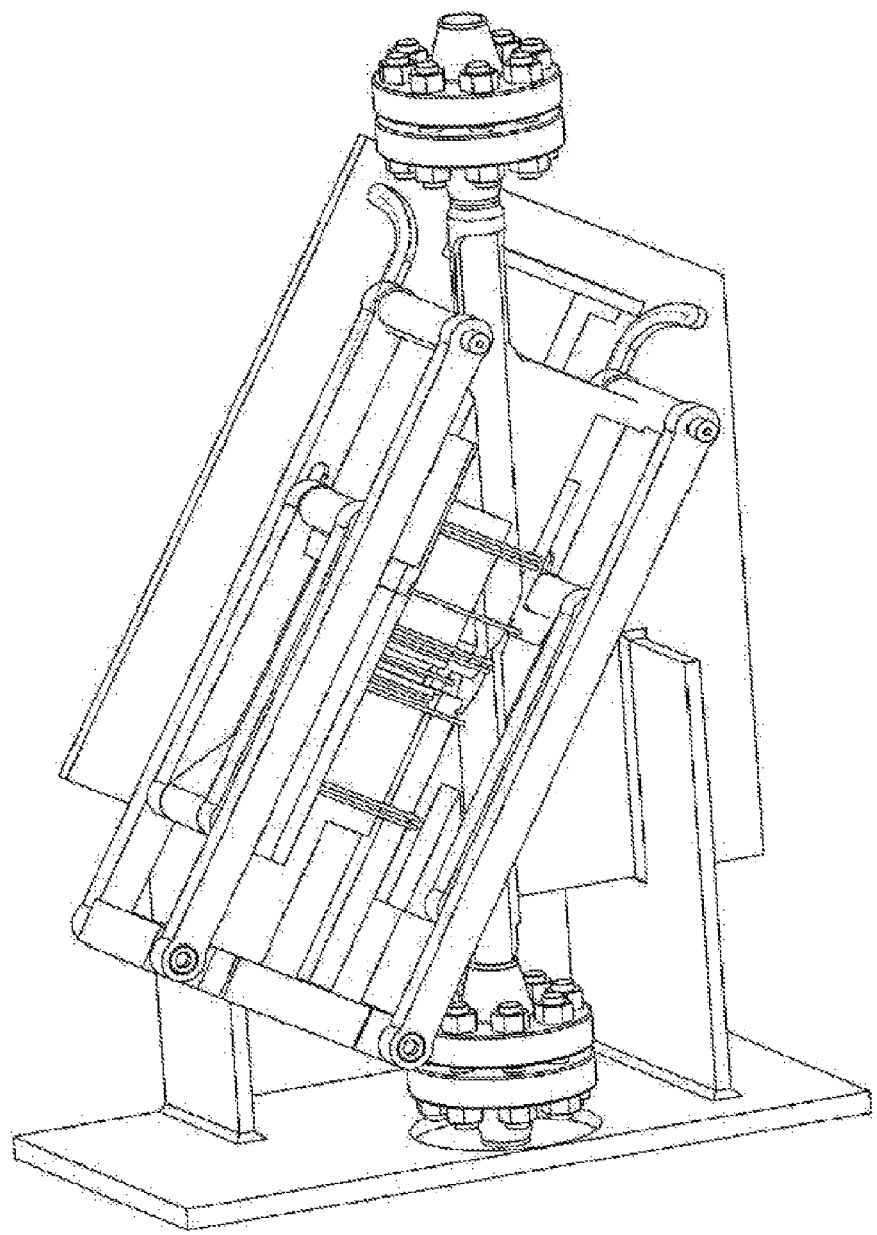
FIG. 3 is a view of the valve assembly of FIG. 1 in a transition arrangement wherein the parts are coupled and the valve is closed.

The male member 4 can be coupled to the female member 6 by relative movement of the probe 7 toward the socket along a coupling axis A:A. FIG. 2 shows the valve assembly 2 in an intermediate coupled position, wherein the distal ends of the probe 7 and sheath 14 abut the piston 30 and internal tube 20 respectively. As the male member 4 is moved further along the coupling axis with respect to the socket, as shown in FIG. 3, the piston 30 and sheath 14 begin to move towards their open positions. The movement of the piston 30 causes the securing means to move relative to the body of the female member. in doing so, the first securing means engages the probe and accordingly locks the probe and piston together. As the second securing means moves it engages the sheath 14 and accordingly locks the sheath 14 and socket together.

Figure 4:
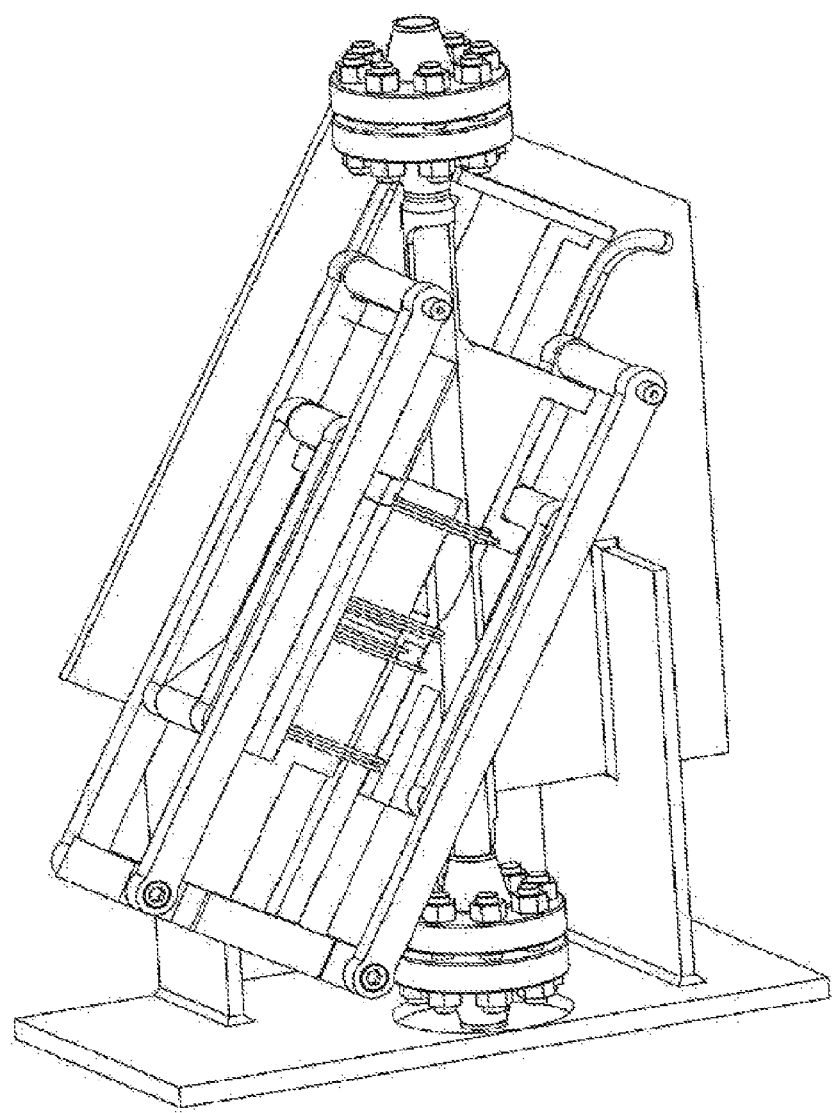
FIG. 4 is a view of the valve assembly of FIG. 1 in a coupled and open arrangement.

The probe 7 is inserted into the socket until it reaches a coupled position, as shown in FIG. 4. In the coupled position, the aperture 12 in the probe 7 is in communication with the aperture 28 in the socket and the sheath 14 and piston 30 are in their open positions. Consequently, fluid may flow between the two fluid passageways 8, 22. For instance, pressurised fluid in the second fluid conduit (not shown) flows along the fluid passageway 22 and out of the aperture 28 in the face of the socket. The fluid is retained in the socket by sealing rings on the probe. The fluid pressure acts on one sealing ring to expel the probe and on another sealing ring to draw it further in to the socket. Because the sealing rings are the same size and the pressure equal, a zero net force is created. The fluid may then enter the fluid passageway 8 through aperture 12 before flowing into the first fluid conduit (not shown). When the probe 7 is withdrawn from the socket, the engagement between the second securing means and the sheath 14 ensures that the sheath returns to the closed position. Likewise, the engagement between the probe 7 and outer cage 36 ensures that the piston returns to the closed position. Furthermore, because during coupling and de-coupling, the probe 7 and piston 30 are locked together until the apertures 12, 28 are fully closed, no separation force is generated during coupling and de-coupling; even when pressurised fluid remains in the fluid passageways.

The probe body 7 is generally cylindrical with an axis coincident with the coupling axis A-A. The first fluid access aperture 8 is arranged on a distal end face 40 of the male member. A circumferential flange 42 extends about the probe 7 and is spaced axially from the end face 40. The circumferential flange 42 comprises two opposed radial faces 44, 46. Radial face 44 faces towards the end face 40 and is chamfered such that the intersection between the radial face 44 and the probe 7 is closer to the end face 40 than the circumference at the rim of the flange is to the end face. Radial face 46 faces away from the end face 40 and at a right angle to the probe.

The second aperture 12 is arranged on a circumferential face of the probe Located either side of the aperture 12 are annular sealing rings. Each annular sealing ring is housed in an annular groove formed in the probe 7. The sheath 14 is arranged to fit about the distal end region of the probe. The external profile of the sheath remains cylindrical apart from a radial flange 45. When the sheath 14 is assembled about the probe 7 it is freely slidable along the coupling axis A-A. The sheath 14 is moveable towards the open position by sliding the sheath relative to the probe and away from the distal end face 52. In the open position a distal end of the sheath moves clear of the sealing rings. The sheath 14 is slidable towards the closed position by sliding the sheath relative to the probe and towards the distal end face 52. When in the closed position, the sheath 14 is typically delimited by abutment probe and sheath.

The piston 30 is a cylindrical rod sized to fit within the socket. The piston 30 includes a distal end and annular sealing rings that are housed in annular grooves formed in the piston. The sealing rings seal the piston to the socket thereby retaining fluid from egressing the socket when the piston is in the closed position.

The male 4 and female members 6 can be releasably coupled and decoupled by moving the two members relative to each other along the coupling axis. As shown in FIG. 2, the distal end 52 of the probe abuts the distal end 66 of the piston and the distal end 60 of the sheath abuts the distal end 62 of the socket. In this position, the apertures 12 and 28 remain closed as the sheath 14 and piston 30 have not moved from their closed positions. As the probe 7 is inserted further into the socket the abutment between the probe 7 and piston 30 moves the piston towards its open position. Due to the annular sealing rings being offset from the aperture 28, the piston 30 can move a small distance with the aperture 28 remaining closed. The movement of the piston causes the sealing means to engage the sheath and probe.

The arrangement of the sealing rings are such that the securing means are urged to their clamped positions, prior to the sealing ring moving past the aperture 28. As the probe 7 continues to be inserted into the socket, the sheath 14 remains in position relative to the socket thereby opening the aperture 14. The first and second securing means slide relative to each other with the piston opening the aperture 28. Normally, if pressurised fluid was within one or both of the fluid passageways 8, 22, the pressure would force the probe 7 out of the socket. However, because the probe 7 and socket cannot move away from each other because they are locked together by the securing means they act as one piece.

Accordingly, a zero net coupling force is created. Moreover the force required to couple the male and female coupling members is independent of the pressure of the fluid within the fluid passageways.

Insertion of the probe is stopped when the sheath 14 and piston 30 are fully opened.

When coupled it may be desirable to include a predetermined breakout strength to the assembly. Due to the annular sealing rings being of the same size, when coupled, the pressure of the fluid acting on opposed sealing rings produces a zero net separation force. Accordingly the breakout strength is determined independently of the pressure within the fluid passages. The assembly can be decoupled by withdrawing the probe from the socket.

As the probe 7 is withdrawn, the securing means are caused to release the respective probe and sheath, the piston 30 is caused to move towards its closed position, and the sheath also caused to move relative to the probe 7 towards its closed position. The apertures 12 and 28 are closed by the sheath and pistons respectively before the securing means release the sheath 14 and probe 7 respectively.

Consequently, the male member 4 is decoupled from the female member 6, again without creating a separation force. Furthermore, the apertures are closed by the decoupling of the coupling members such that when the members are decoupled the valves are always shut.

The securing means will now be described in more detail. Referring back to FIG. 1, the first securing means 100 comprises a pair of arms 110 that are pivotally attached to the piston 30 at one end. The opposed ends are arranged to pivot towards each other to engage the probe. Whilst the exemplary embodiments are shown as having a pair of arms 110, it will be appreciated that the system would work with only one arm, but that for symmetry and to balance the forces two opposed arms are provided. Indeed, it is possible to provide more than two arms. However, only one of the arms is described herein. The arm 110 is pivotally attached to the piston at pivot 112. Consequently, as the piston moves during coupling/decoupling the pivot 112 also moves. The arm 110 is arranged so that it can pivot over radial flange 42 of the probe to secure the piston and probe together. In use, when the arm 112 is pivoted to secure the probe, the arm lies generally parallel to the coupling axis. Consequently, any separation forces between the probe and piston are carried by the arm as a tension force.

The distal end of the arm 110, opposed to the pivotal connection is shown as including a follower 120 of a cam and follower arrangement. However, it will be appreciated that the follower may be formed on other parts of the arm 110. The follower 120 is arranged to cooperate with a cam so as to control movement of the arm. As shown in the figures, the cam is suitably a slot within which the follower is arranged. The cam is shaped to control the movement of the arm. As will be appreciated, the cam includes a first section 121 that is arranged to move the follower parallel to the coupling direction as well as transverse thereto in order to cause the arm 110 to pivot and close over the probe. It will be appreciated that the first section is arranged to pivot the arm whilst the follower moves in the coupling direction the off-set distance between the seal and aperture. The cam includes a second section that controls the movement of the arm as the piston is caused to open the socket. Consequently, the second section 122 of the cam is generally parallel to the coupling direction.

The arm 110 engages the face 44 of the radial flange 42 of the probe. The face is perpendicular to the coupling direction so that no bending forces are generated as the arm 110 is tensioned. The arm 110 includes a catch 115 that is caused to pivot over the probe. The catch is shown as a bar having a circular cross-section so that the catch has a single point of contact with the face of the flange.

The cam is formed in the body of the socket and is shown as being formed in a plate that runs to the side of the coupling. Again, it will be appreciated that for balance, a cam and follower is provided on each side of the coupling and arm 110 is formed as a pair of arms on each side.

The second securing means 200 is shown as a pair of arms 210 that are pivotally attached to the socket at one end. The opposed ends are arranged to pivot towards each other to engage the sheath. Whilst the exemplary embodiments are shown as having a pair of arms 210, it will be appreciated that the system would work with only one arm, but that for symmetry and to balance the forces two opposed arms are provided. Indeed, it is possible to provide more than two arms. However, only one of the arms is described herein.

The arm 210 is pivotally attached to the socket at one end and arranged so that it can pivot over radial flange 45 of the sheath to secure the socket and sheath together. In use, when the arm 210 is pivoted to secure the sheath, the arm lies generally parallel to the coupling axis. Consequently, any separation forces between the sheath and socket are carried by the arm as a tension force.

The arm 210 is constrained to pivot with the arm 110 of the first securing means. However, the first and second securing means connected so that they can slide relative to each other and such that, as shown in the figures, the first arm can slide relative to the second arm. Here, a protrusion of the second arm slides within a slot formed in the first arm. However, other sliding connections are envisaged.

The arm 210 engages a face of the radial flange 45 of the sheath. The face is perpendicular to the coupling direction so that no bending forces are generated as the arm 110 is tensioned. The arm 110 includes a catch 215 that is caused to pivot over the sheath. The catch is shown as a bar having a circular cross-section so that the catch has a single point of contact with the face of the flange Because movement of the securing means to clamp and unclamp the respective part is controlled by the cam and follower arrangement, the securing means are able to abut the respective parts orthogonal to the coupling direction such that no bending forces are generated on the arms of the securing means as they are tensioned in use. Consequently, jamming of the coupling is reduced.

To ensure the correct timing of the coupling, the piston needs to be fully in probe and sheath must be in the correct position relative to the piston and socket before the piston begins to move relative to the socket. In the figures, the tip of the probe and sheath is arranged to seal into the piston and socket as shown in enlarged detail. Timing would be lost if the piston started to move before the parts were properly mated. Consequently, the seals between the probe and sheath and the seals between the piston and socket are arranged to generate a greater frictional force resisting movement than the force required to fully mate the probe and socket. Consequently, the probe and socket will always be mated before movement of the piston and socket is initiated.

Figure 5:
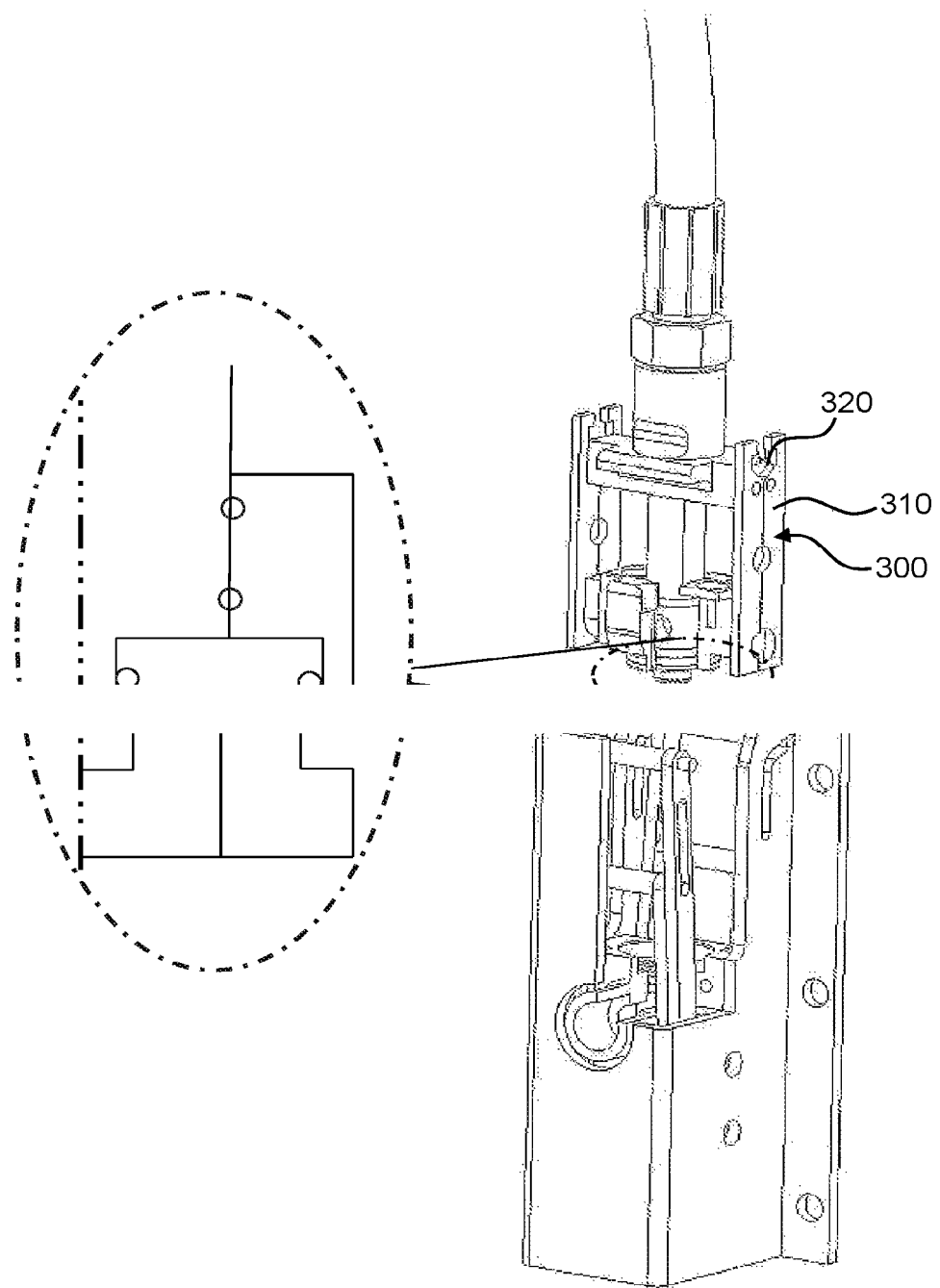
FIG. 5 is a view of an alternative embodiment in an uncoupled or closed arrangement.
Figure 6:
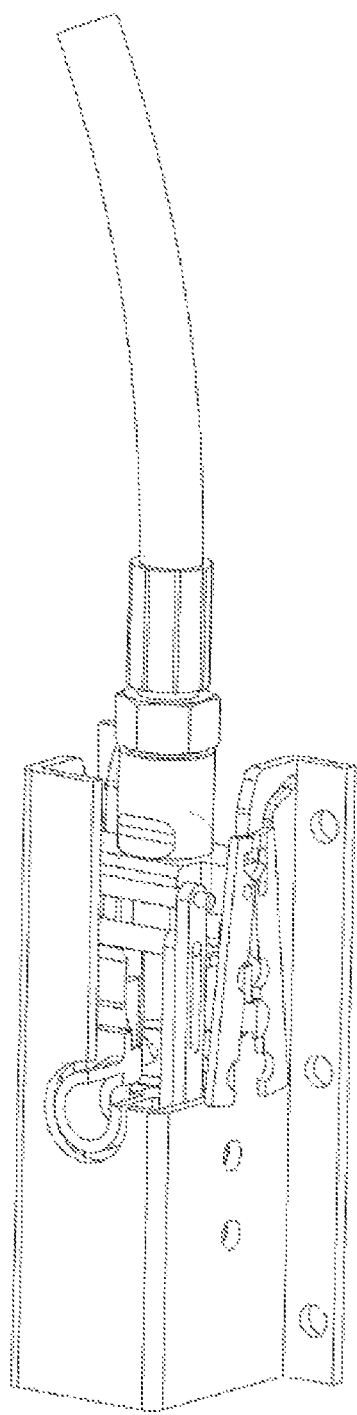
FIG. 6 is a view of FIG. 5 coupled and open.

However, as shown In FIGS. 5 and 6, a retaining means 300 is advantageously provided to retain the sheath and probe in relative position prior to the probe and socket being fully mated. Here, the retaining comprises a peg 310 that is arranged to move relative to the sheath from a retained position to a free position. In the retained position, the peg prevents relative movement. In the free position, the sheath is able to slide on the probe. A resilient member such as a spring 320 biases the peg to the retained position. The peg captures a protrusion of the sheath. The peg and protrusion are shaped so that as the sheath moves on the probe, the peg is urged to move to the free position. The retaining means thereby prevents movement of the sheath on the probe until the force urging the sheath to move overcomes the bias force of the retaining member 320.

The peg 310 may comprise tow opposed peg members 311, 312, that are arranged to pivot apart to release and pivot towards each other to retain the sheath. Consequently, the force required to cause the sheath to move can be more accurately controlled and set to ensure correct timing of the mechanism.

Further exemplary embodiments are now described with reference to FIGS. 7 to 23.

Figure 7:
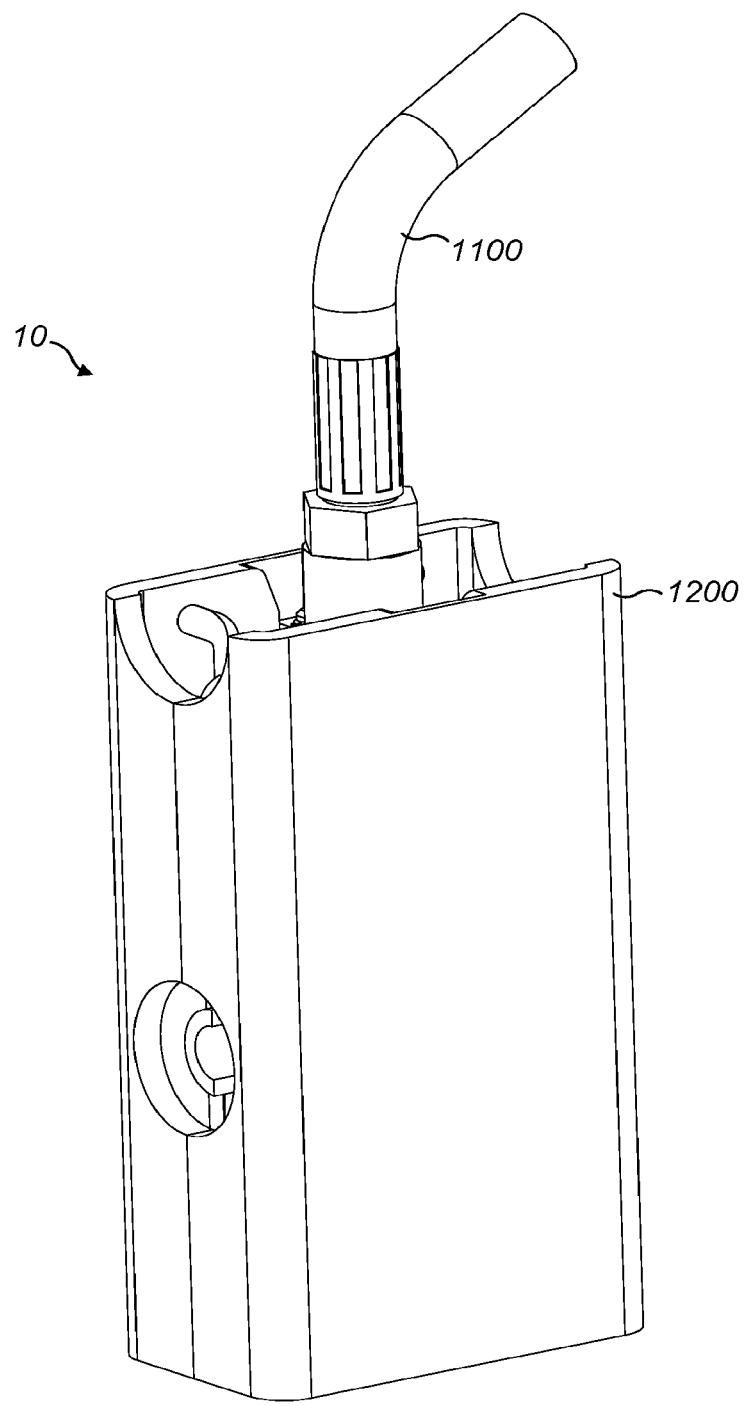
FIG. 7 is a perspective view of a coupling assembly in a coupled arrangement.

FIG. 7 is a perspective side view of a valve assembly 10 in a coupled arrangement.

The valve assembly is arranged for releasably coupling, i.e. coupling and uncoupling. Suitably, the valve assembly comprises a pair of coupling members consisting of a male coupling member 1100 and a female coupling member 1200. The male member 1100 can be coupled to the female member 1200 by relative movement along a coupling axis. That is, coupling is effected by relative linear motion. Notably, linear motion is easy to actuate using robots.

The female coupling member 1200 is arranged to receive and engage the male coupling member 1100 so that they may be coupled together. The female coupling member is also arranged to release the male coupling member so that they may be uncoupled.

Figure 8:
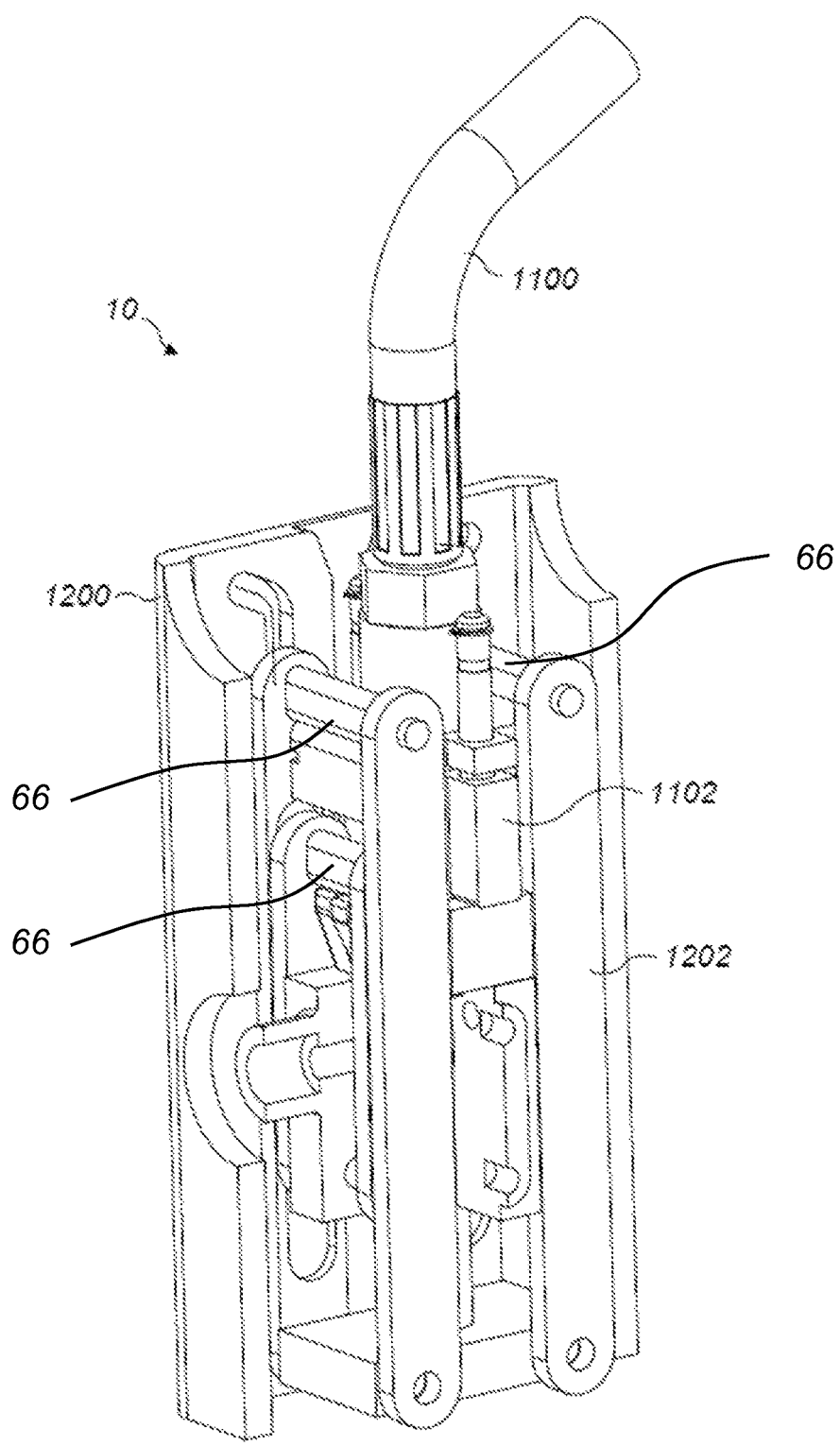
FIG. 8 is a perspective, partially cut-away side view of coupling assembly in a coupled arrangement.

FIG. 8 is a partial cut-away side view of the valve assembly 10 in a coupled arrangement.

The male member 1100 includes a body 1102 arranged for insertion into the female coupling member 1200 and to couple thereto. Suitably, the female coupling member includes a body 1202 arranged to receive and engage the body of the male coupling member.

Figure 9:
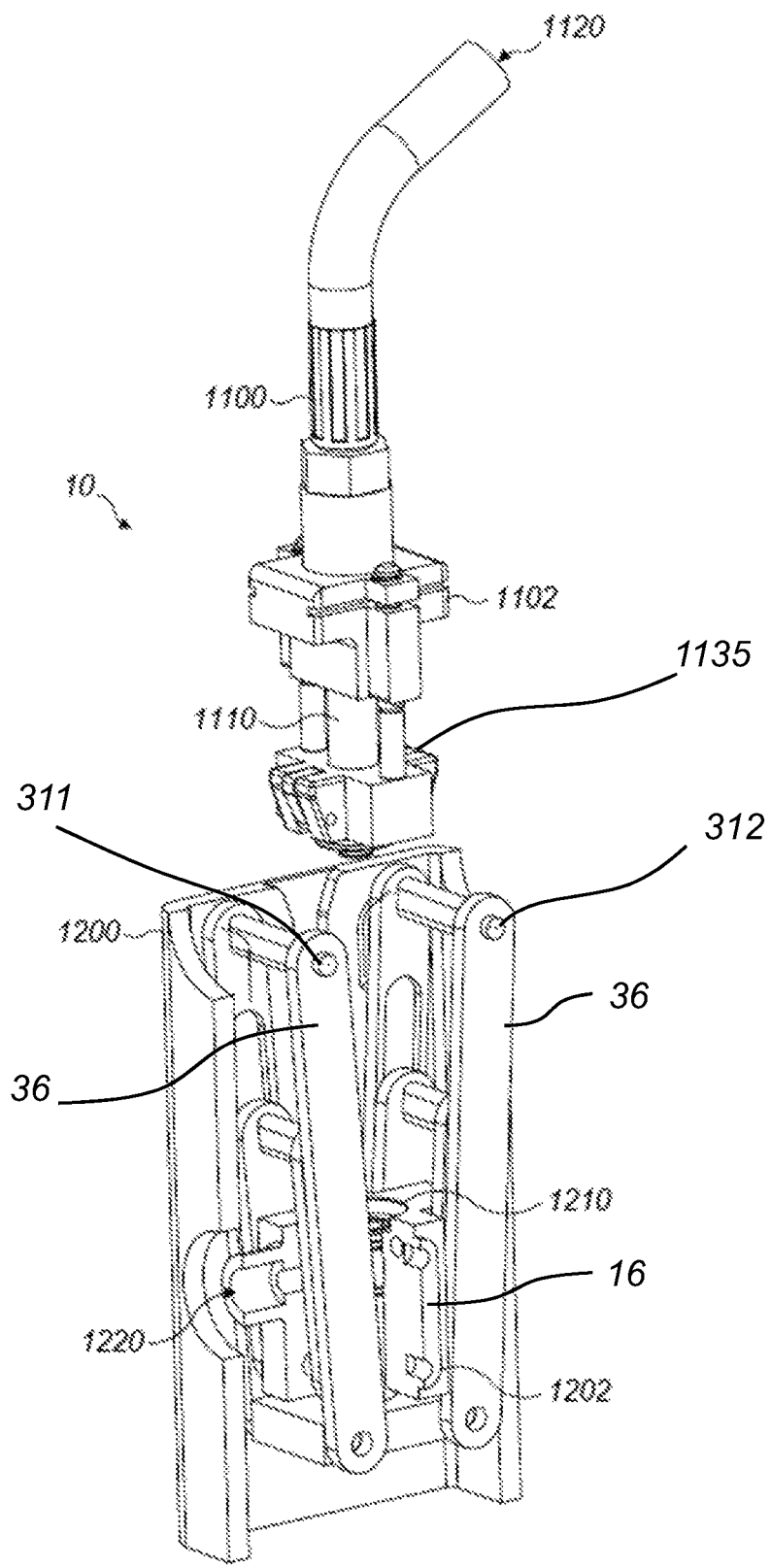
FIG. 9 is a perspective, partially cut-away side view of a coupling assembly in an uncoupled arrangement.

FIG. 9 is a perspective side view of the male coupling member 1100 and a partial cut-away perspective side view of the female coupling member 1200.

The male coupling member 1100 comprises a probe 1110 projecting from the body 1102. The probe has a shape suitable for insertion into a socket of the female coupling member. For example, the probe may be a projection having a circular, oval or polygonal cross-section. The cross-section may be substantially constant along the probe. In this example, the probe is a projection having a circular cross-section which is substantially constant, resulting in a cylindrical overall form.

The body 1202 of the female coupling member 1200 is arranged to receive the probe 1110. Suitably, the body forms a socket 1210 for receiving the probe 1110. The socket is a recess having a shape corresponding to that of the probe. In this example, the probe being cylindrical, the socket is a generally cylindrical recess arranged to receive the probe.

When the coupling assembly 10 is in a coupled arrangement, fluid may flow between the male coupling member 1100 and the female coupling member 1200. Suitably, a first fluid passageway 1120 extends through the male coupling member 1100 and, in particular, through the probe 1110. Similarly, a second fluid passageway 1220 extends through the female member 1200 and, in particular, to the socket 1210. Conveniently, the first fluid passageway and the second fluid passageway are arranged to be in flow communication when the probe is received by the socket.

Figure 10:
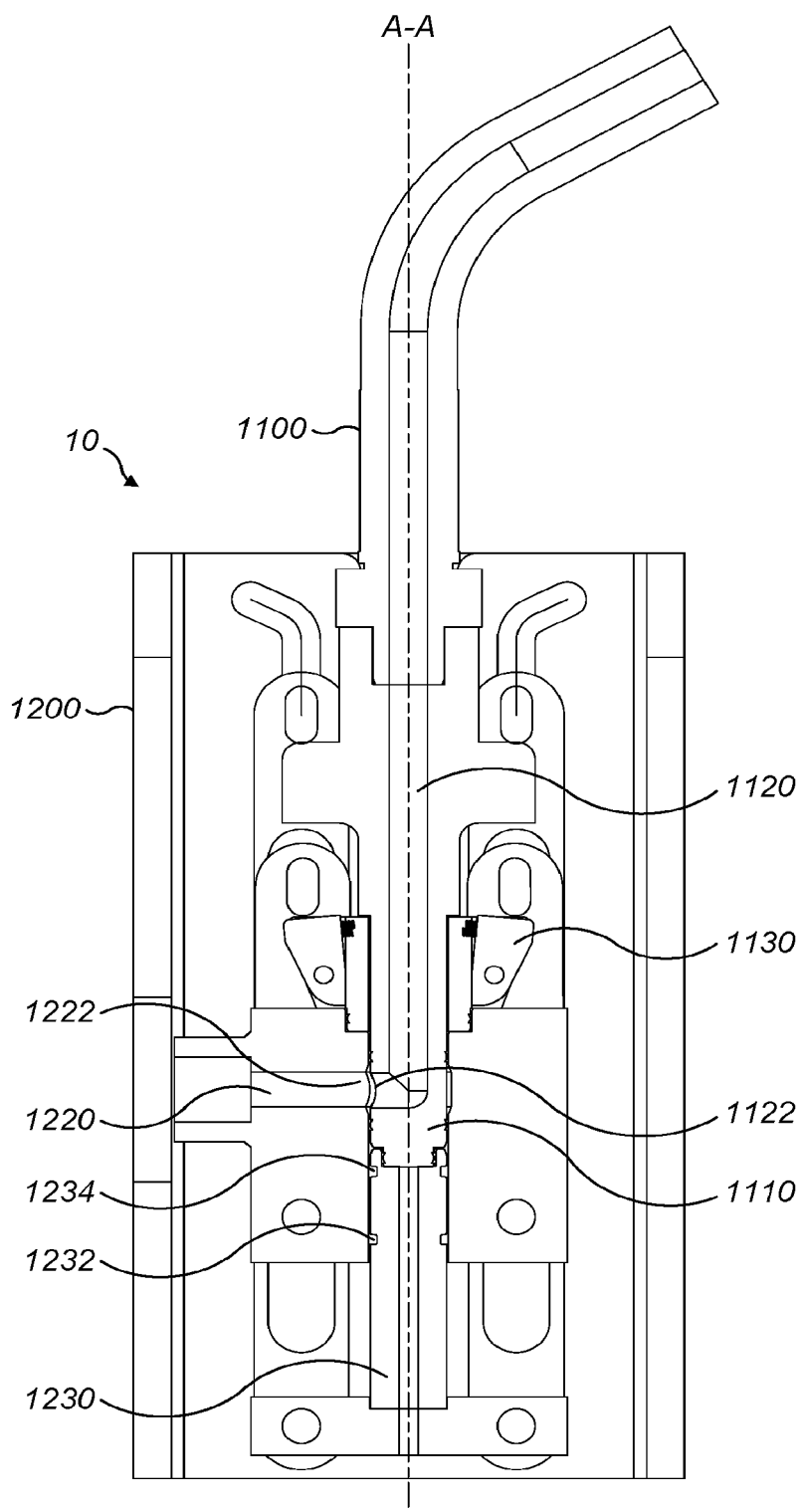
FIG. 10 is a cut-away side view of a coupling assembly in a coupled arrangement.

FIG. 10 shows a cut-away side view of the coupling assembly 10 in a coupled arrangement.

The first fluid passageway 1120 extends through the probe 1110 from a first exit aperture 1122 arranged on a circumferential face of the probe. In use, fluid may flow into the first fluid passageway through the first exit aperture or flow out of the first fluid passageway through the first exit aperture.

The male coupling member 1100 is arranged to prevent unwanted fluid flow through the passageway 1120. Suitably, the probe 1110 is provided with a sheath 1130 for selectively restricting fluid flow. In this example, the sheath encloses the probe and is slidably mounted thereto. The sheath is slidable between an open position, in which the sheath does not restrict the first exit aperture 1122, and a closed position (shown in FIG. 9), in which the sheath restricts fluid egress from the aperture.

A second fluid passageway 1220 extends through the female member 1200 from a second exit aperture 1222 arranged on an internal circumferential face of the socket 1210.

The female coupling member 1200 is arranged to prevent unwanted fluid flow through the passageway 1220. Suitably, the female coupling member comprises a piston 1230 which is mounted within the socket 1210. The piston is unbiased and free to slide between an open position, in which the piston does not restrict the second exit aperture 1222, and a closed position (shown in FIG. 9) in which the piston restricts fluid egress from the aperture.

Suitably, the piston 1230 is provided with a pair of sealing rings 1232, 1234 located in annular grooves extending circumferentially around the piston. When the piston is in the closed position, a first or proximal sealing ring 1232 is located to the proximal side of the exit aperture 1222, while a second or distal sealing ring 1234 is located on the distal side of the exit aperture. Any pressure due to fluid in the second fluid passageway 1220 acts on both sealing rings 1232, 1234 and, because the sealing rings are substantially identical and located on either side of the exit aperture, a zero net force is exerted on the piston in its closed position. Accordingly, the exit aperture remains closed.

As shown in FIG. 9, when uncoupled the sheath 1130 and piston 1230 are in their closed positions. Accordingly, pressurised fluid in the fluid passageways 1120, 1220 is restricted from egressing through the respective apertures 1122, 1222 due to the sheath and piston being in closed positions.

The male member 1100 can be coupled to the female member 1200 by relative movement of the probe 1110 toward the socket 1210 along the coupling axis A:A.

Figure 11:
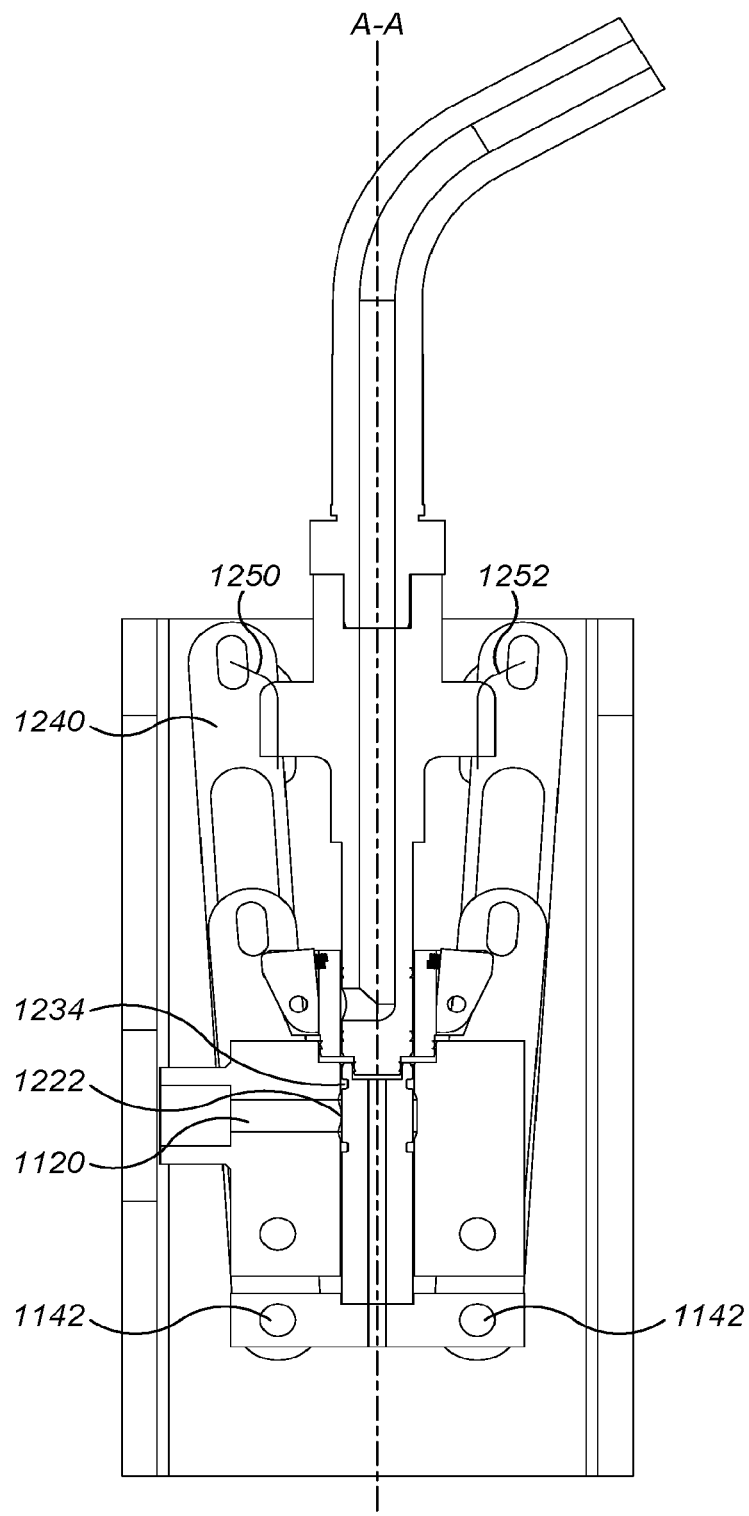
FIG. 11 is a cut-away side view of a coupling assembly in a partially coupled arrangement.

FIG. 11 shows the valve assembly 10 in an intermediate coupled configuration, wherein a distal end of the probe 1110 abuts a distal end of the piston 1230, and a distal end of the socket 1210 abuts a distal end of the sheath 1130.

In the intermediate coupled configuration of FIG. 11, the piston 1230 is not displaced from its closed position but would be displaced once the probe 1110 is inserted farther. Upon further insertion, the distal sealing ring 1234 reaches the first exit aperture 1222 and a separation force is exerted on the piston and the probe by pressurised fluid in the fluid passageway 1220. The force on the piston is to urge the piston 1230 towards the open position, and the force on the probe is to eject the probe 1210 from the socket 1210. Suitably, the female coupling member 200 comprises an outer cage 1240 arranged to keep the piston and the probe together.

The outer cage 1240 is arranged to engage the male coupling member 1100 when the male and female coupling members are being coupled. Suitably, the outer cage is arranged to secure the probe 1110 and the piston 1230 together as the probe is inserted into the socket 1210 and urged against the piston. Conveniently, the outer cage secures probe and piston prior to the distal sealing ring 1234 reaching the first exit aperture 1222, i.e. prior to the probe and the piston being forced apart by fluid pressure.

Suitably, the outer cage 1240 is pivotally arranged about the piston 1230. Conveniently, the outer cage is arranged such that the probe urging the piston out of its closed position causes the outer cage to enter a closed configuration in which the probe is secured.

The outer cage 1240 is pivotally connected to a first pivot 1242 moveable with the piston 1230. The first pivot may be any suitable coupling, such as a pivot joint or pivot hinge. Further, the outer cage is arranged so that it is caused to pivot as the piston is displaced from its closed position towards its open position. Suitably, a follower 1244 of the outer cage is mounted to a first track 1250.

The follower 1244 may be any member suitable for being mounted to a track and being moveable along the track. For example, the follower may be roller. In this example, the follower is a projection extending into a track 1250. Accordingly, the follower is slidably mounted to the track.

The first track 1250 comprises a first section 1252 along which the follower 1244 is displaceable to cause the outer cage 1240 to pivot relative to the socket 1210. Conveniently, the first track is arranged so that the outer cage is pivoted as the piston 230 is being displaced from its closed position towards its open position. Suitably, the first section 1252 guides the follower 1244 towards the coupling axis A:A.

The outer cage 1240 is arranged to be in its closed configuration as the distal sealing ring 1234 reaches the second exit aperture 1222. Thereby it is ensured that the outer cage has closed about the male coupling member 1100 so that a separation force exerted by pressurised fluid in the second fluid passageway 1220 is carried by the outer cage 1240. A zero net separation force results so that even where pressured fluid is present in the fluid passageways, the probe 110 and the piston 1230 are restrained from moving relative to each other.

Figure 12:
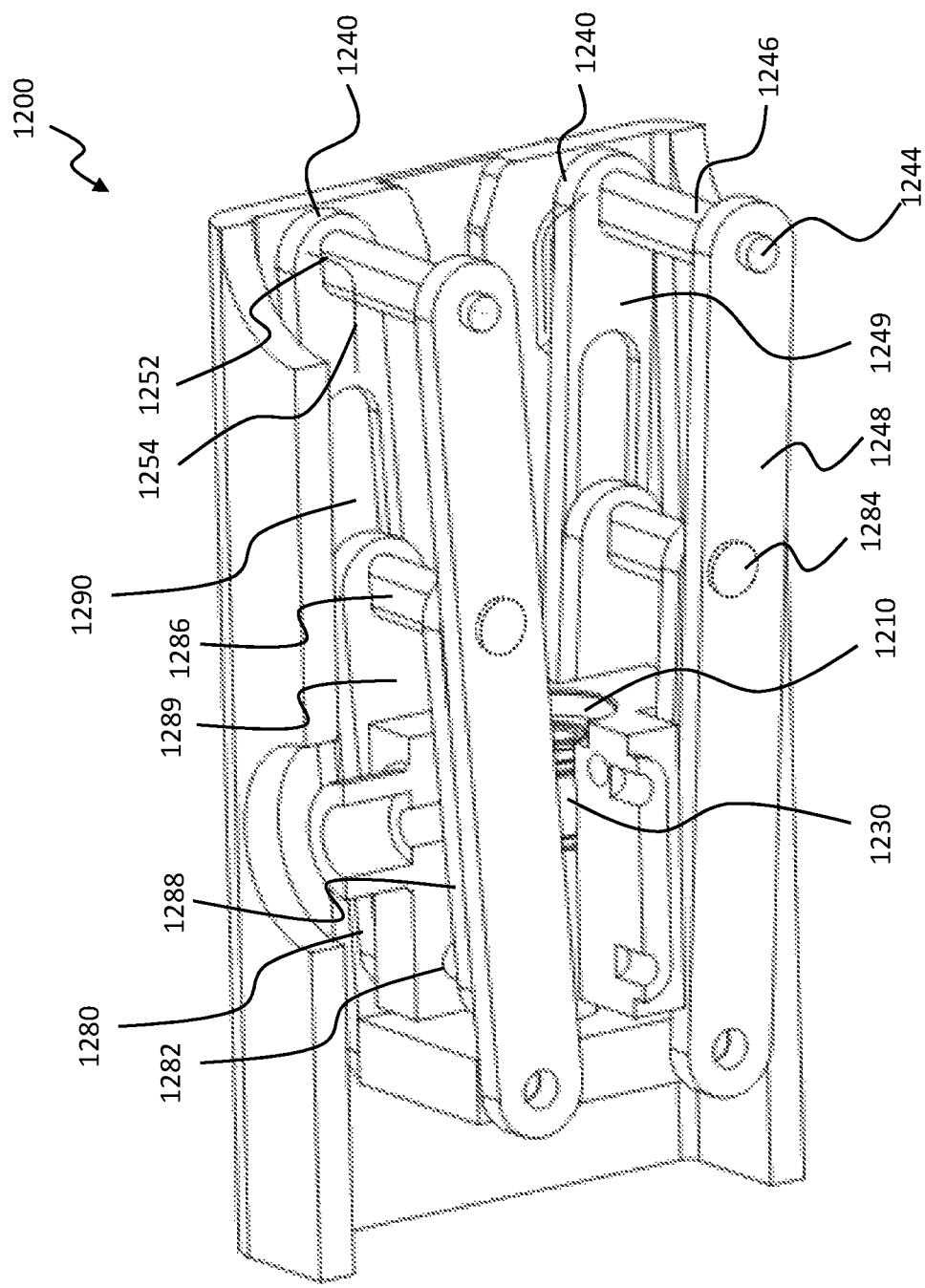
FIG. 12 is a perspective, partially cut-away side view of a female coupling member.

FIG. 12 is a perspective, partial cut-away side view of the female coupling member 1200.

In response to insertion of the probe 1110 into the socket 1210, the outer cage 1240 is brought into its closed configuration. Conveniently, in the closed configuration the outer cage carries any separation forces acting to expel the probe from the socket.

As the probe 1110 is inserted farther into the socket 1210, the outer cage 1240 continues to carry any separation forces. Suitably, the outer cage is displaceable in its closed configuration to follow the probe and the piston 1230. Suitably, the first track 1250 comprises a second section 1254 along which the first follower 1244 is displaceable to move the outer cage in the closed configuration.

In this example, the outer cage 1240 is brought into its closed configuration after having been displaced along the first section 1252 of the track. Accordingly, the outer cage may be shifted to follow the piston 230 without requiring additional pivoting of the outer cage. Suitably, the second section 1252 of the track extends parallel to the coupling axis A:A. Hence, the second section is arranged so that as the first follower 1244 is displaced along the second section, the outer cage is shifted without causing the outer cage to pivot further.

As the outer cage 1240 continues to be shifted with the piston 1230 in response to the probe 1110 being inserted into the socket 1210, the outer cage continues to secure the probe to the piston.

The outer cage comprises a crossbar 1246 arranged to engage an outer shoulder 1104 of the male coupling member 1100. Conveniently, the crossbar is shaped for improved rigidity. For example, the crossbar may have an oval or elliptical cross-section so as to better withstand forces acting along the major axis of the crossbar. In this example, the crossbar extends between a first side member 1248 and a second side member 1249 of the outer cage.

In this example, the follower 1244 is formed integrally with the crossbar 1246. Suitably, the follower and crossbar may be formed integrally using an elongate member, such as shaft or pole. Conveniently, the follower and/or the crossbar may be reinforced to withstand repeated coupling and uncoupling.

Conveniently, uncoupling of the male and female coupling members 1100, 1200 causes the outer cage 1240 to enter its opened configuration. As the male coupling member is withdrawn from the female coupling member, the male coupling member pushes against the crossbar 1246 of the outer cage. Accordingly, the outer cage is urged along the second section 1254 of the track, in the direction of the uncoupling. As the outer cage is connected to the first pivot 1246, which is moveable with the piston 1230, this causes the piston to be displaced in response to the first pivot being displaced. Consequently, during withdrawal of the male coupling member the outer cage 1240 continues to keep the probe 1110 and the piston 1230 together.

As the male coupling member continues to be withdrawn, the crossbar 1246 is urged further. This eventually causes the first follower 1244 to be displaced along the first section 1252 of the track. As the first follower is displaced along the first section of the track along the direction of withdrawal, the outer cage is caused to pivot away from the piston 1230 until the male coupling member 1100 is released. Conveniently, the outer cage is caused to release the male coupling member once the exit aperture 1222 is sealed by the piston. That is, the distal sealing ring 1234 will have passed the second exit aperture and located on its distal side.

Accordingly, during uncoupling the male coupling member 1100 urges against the crossbar 1246 and hence displaces the outer cage 1240 along the direction of uncoupling. As the outer cage is being urged into the direction of uncoupling, the first follower 1244 is displaced along the first track 1250 to cause the outer cage to enter its opened configuration. During uncoupling, motion of the outer cage along the axis of coupling is caused by the male coupling member pushing against it. By contrast, motion of the outer cage along a non-coupling axis direction, i.e. the pivoting of the outer cage, is caused by the first follower being displaced along the first track.

During insertion of the probe 1110 into the socket 1210, the first exit aperture 1122 transitions from the sheath 1130 into the socket. During this transition, the sheath may be displaced by pressurised fluid egressing from the first and/or second exit aperture, resulting in an unwanted egression of fluid. Suitably, the female coupling member comprises an inner cage 1280 arranged to secure the sheath. The inner cage is pivotally arranged about the socket 1210 so that, in use, the inner cage may secure the sheath 1130 of the male coupling member 1100 during insertion of the probe 1110.

The inner cage 1280 is pivotally connected to a second pivot 1282 defining a second pivot axis. Suitably, the second pivot connects the inner cage to the body 1202 of the female coupling member 1200. Accordingly, the inner cage may pivot relative to the socket 1210. In this example, the second pivot axis is parallel to the first pivot axis and perpendicular to the coupling axis A:A.

Pivoting of the inner cage 1280 is caused by a second follower 1284 being displaced along a second track 1290. In this example, the second track is formed inside the outer cage 1240. Conveniently, the second track is formed in the side member 1246, 1248. Suitably, the inner cage is mounted inside the outer cage, i.e. between the side members.

The second follower 1284 is mounted to the second track 1290 and displaceable along the second track when the inner cage 1280 and the outer cage 1240 are subjected to relative movement. During insertion of the male coupling member 1100, the outer cage 1240 is displaced relative to the body 1202. This causes the outer cage as well to be displaced relative to the inner cage, which is pivotally joined to the body 1202.

In this example, the second track 1290 is straight and extends between the first pivot axis and the axis of rotation defined by the first follower 1244. Suitably, the outer cage 1240 occupies a space between the first pivot axis and the axis of rotation of the first follower. Conveniently, the second track delimits motion of the second follower from below and from above, hence causing the second follower to move up and to move down during uncoupling and coupling.

In other examples, the second track 1290 is formed by the inner cage 1240 and the second follower 1284 formed by the outer cage 1240.

As the outer cage 1240 is caused to pivot relative to the socket 1210, the inner cage 1280 is also caused to pivot relative to the socket. With the first follower 1242 being displaced along the first section 1252 of the first track 1250, which causes the outer cage to pivot, the second follower 1284 is subjected to the pivoting motion of the outer cage as the second follower is displaced along the second track. The inner cage, therefore, is caused to pivot towards the coupling axis as the outer cage is caused to pivot towards the coupling axis. Accordingly, the inner cage assumes a closed configuration.

In the closed configuration the inner cage 1280 engages the sheath 1130. Suitably, the inner cage comprises an inner crossbar 1286 arranged to engage the shoulder 1135 of the sheath 1130. In this example, the inner crossbar extends between a pair of inner side members 1288, 1289. During coupling, the inner crossbar retains the sheath in position against any separation force that may act on the sheath.

Figure 13:
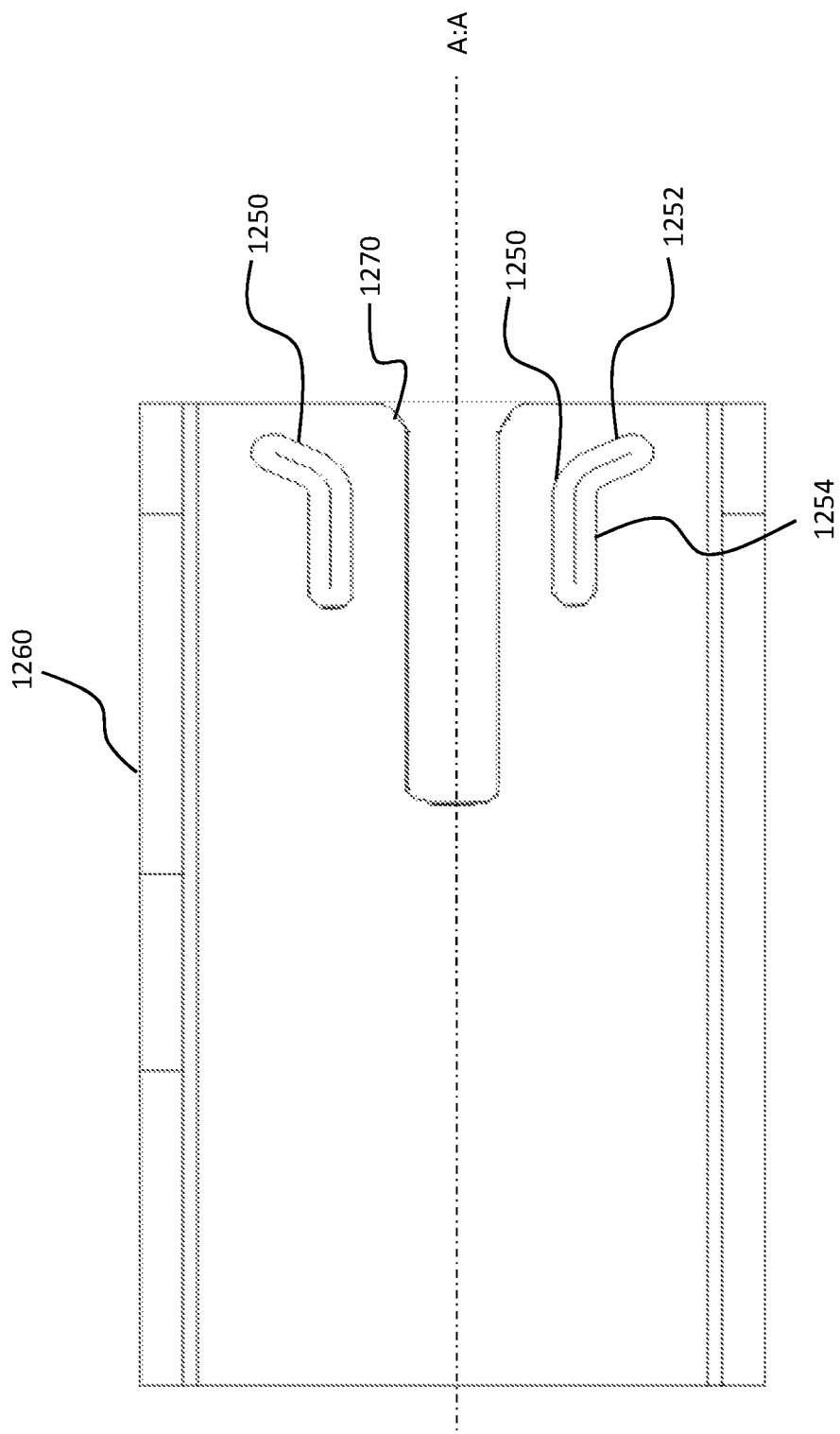
FIG. 13 is a partially cut-away side view of a housing of a female coupling member.

FIG. 13 is a partial cut-away side view of a housing of the female coupling member showing the first track 1250.

The first track 1250 is formed in a sufficiently rigid structure to receive the follower 1244 and to cause the outer cage 1240 to pivot as the follower is displaced along the track. Suitably, the first track is formed in a housing 1260 of the female coupling member 1200. Alternatively, the first track may be formed in any other sufficiently rigid structure.

In this example, the first track 1250 is a recess or channel extending through the housing 1260. Accordingly, the first follower 1244 is moveable along or inside the first track but restricted from any other motion. The first track being arranged to cause the outer cage to pivot during coupling and during uncoupling, the first track is required to raise and to lower the first follower. Suitably, the first track is delimited from below and from above by a suitably rigid structure.

The first track 1250 comprises the first section 1252 and the second section 1254. As was explained above, the first follower 1244 is displaceable along the first section 1252 of the track to pivot the outer cage, and is displaceable along a second section of the first track to shift the outer cage parallel to the coupling axis.

Suitably, during insertion of the male coupling member 1100 the outer cage 1240 is brought into its closed configuration before fluid may egress from or into the second exit aperture 1222. Accordingly, the first section 1252 of the track has a length which, when projected onto the coupling axis A:A, is equal to or greater than the separation between the distal sealing ring 1234 and the second exit aperture 1222 when the piston 1230 is in its closed position. Thereby it is ensured that the distal sealing ring reaches the second exit aperture once the outer cage was brought into its closed configuration.

Suitably, the first section 1252 and the second section 1254 are arranged in a V-shape. The second section extends parallel to the coupling axis and the first section at an angle thereto.

It is envisaged that alternatively the follower may be formed in the housing 1260 or other rigid structure and the track 1250 is formed in the outer cage 1240.

In this example, an alignment track 1270 is provided which is arranged to guide the male coupling member into the coupled configuration. Suitably, the alignment track is formed in the housing 1260.

The alignment track 1270 is generally straight and extends parallel to the coupling axis. Towards a distal end of the housing, the alignment track widens where a mouth is formed. Conveniently, insertion of the male coupling member 100 into the mouth of the alignment track may ease coupling of the valve assembly 10.

Figure 14:
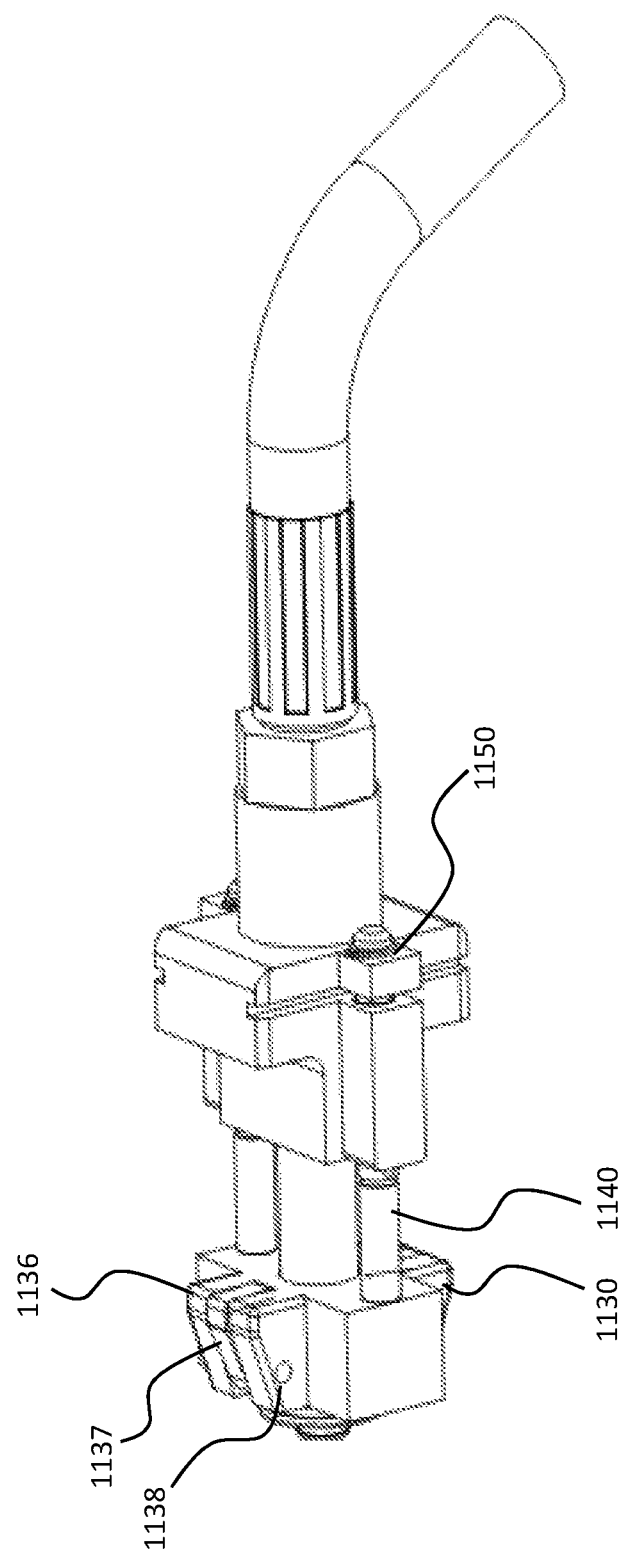
FIG. 14 is perspective side view of a male coupling member.
Figure 15:
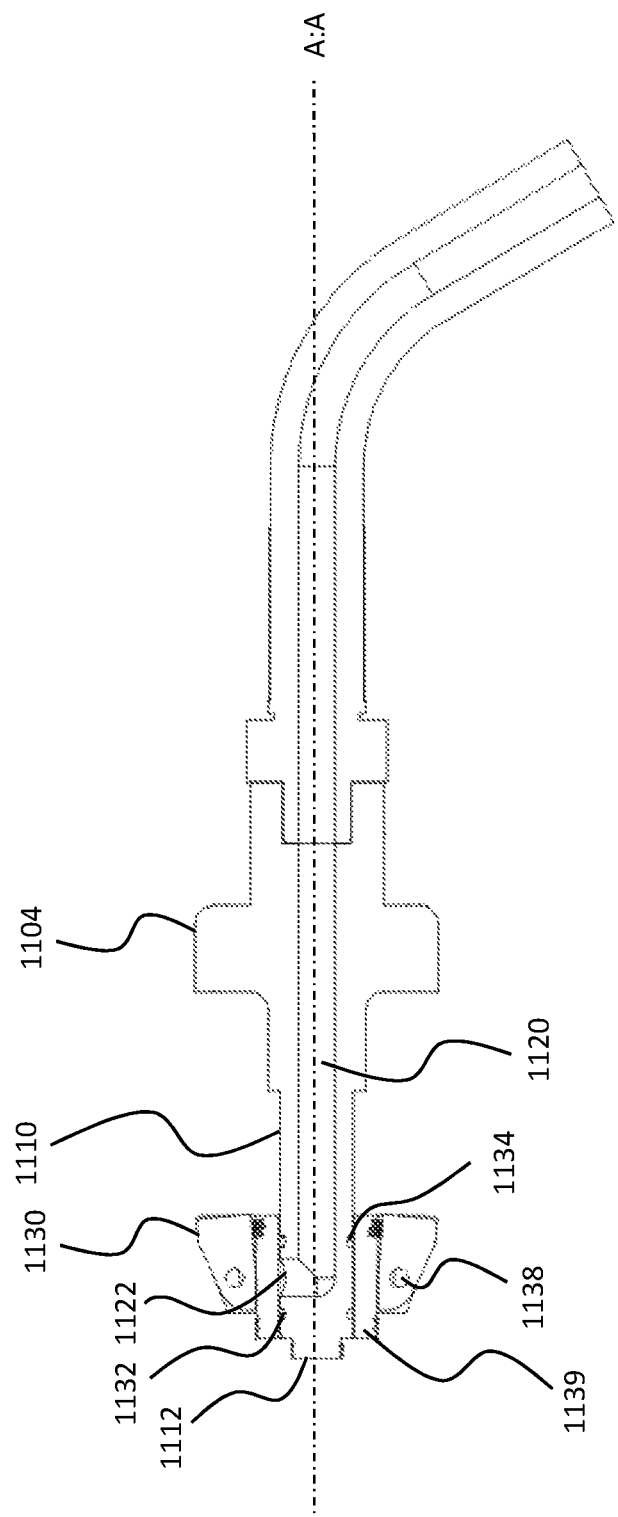
FIG. 15 is a partially cut-away side view of a male coupling member.

FIGS. 14 and 15 show the male coupling member 1100. FIG. 14 is a perspective side view of the male coupling member, while FIG. 15 is a cut-away side view of the male coupling member.

The probe 1110 extends from the main body 1102 along a first direction which is collinear with the coupling axis A:A. The first direction corresponds to the coupling direction, while the opposite corresponds to the uncoupling direction.

The sheath 1130 is moveable between its open position and its closed position through displacement along the coupling axis A:A. When in the closed position, fluid flow through the first exit aperture 1122 is hindered. Suitably, a pair of sealing rings 1132, 1134 is provided in annular grooves extending circumferentially about the probe 1110. A distal sealing ring 1132 is located on a distal side of the first exit aperture 1122, while a proximal sealing ring 1134 is located on a proximal side of the first exit aperture. Thus, when the sheath 1130 is in its closed position, the pair of sealing rings engages the sheath and prevents fluid flow through the first exit aperture.

Moving the sheath 130 towards the proximal end of the probe 1110 brings the sheath 1132 towards the open position. In doing so, the sheath successively exposes the distal sealing ring 1132, the first exit aperture 1122 and the proximal sealing ring 1134. Ultimately, the sheath is brought into abutment with the main body 1102.

The sheath 1130 is arranged on a probe 1110 having a substantially cylindrical shape. A shaft 1140, or peg or rail, is arranged to retain the sheath 1130 in a fixed orientation relative to the probe. The shaft extends from a proximal end of the sheath. Suitably, the shaft is received by a passage 1150 formed in the main body 1102 of the male coupling member 1100. The shaft and the passage are arranged to cooperate to prevent the sheath from rotating about the probe. Suitably, the passage extends along a direction which is parallel to the coupling axis so that, in use, as the sheath is moved towards an open position the shaft is moved in the passage. That is, the shaft is moveable with the sheath, and arranged to move inside the passage.

In this example, the shaft 1140 is arranged to prevent removal of the sheath 1130 from the probe and, thus, define an extremal position of the sheath. In the extremal position, the distal end face of the sheath may be substantially aligned with the distal end face of the probe 1110.

Suitably, the shaft is retained by the passage 1150 and cannot be removed fully from the passage. An abutment member, e.g. a pin, is arranged to prevent the shaft from leaving the passage. Accordingly, the passage may be open-ended and a proximal end of the shaft is provided with the abutment member.

Thereby removal of the sheath 1130 from the probe 1110 may be prevented as the abutment member engages the body 1102 and retains the sheath in an extremal position. The sheath may be in both the extremal position and in its closed position. In this example, the sheath is in its closed position whenever the sheath is in the extremal position.

In this example, the shaft 1140 and the passage 1150 are arranged to hinder the sheath 1130 from leaving its closed configuration. Suitably, the shaft and the passage are configured to provide resistance which must be overcome for the sheath to move away from the closed configuration. Any suitable arrangement of shaft and passage may be used. For example, a resilient member such as a bracket may engage a groove formed in the shaft as the shaft is moved relative to the bracket.

The shaft 1140 is offset relative to the coupling axis along a second direction, which is perpendicular to the first direction and the coupling axis A:A. In this example, a pair of shafts is provided on opposite sides of the sheath, being offset along opposite directions.

An inner shoulder 1135 extends from the sheath 1130. The shoulder extends along a third direction, which is perpendicular to the first direction and the second direction. In this example, a pair of shoulders is provided, the shoulders extending into opposite directions.

In this example, the shoulder 1135 is arranged to aid insertion of the male coupling member 1100. Suitably, the shoulder has a smaller extent towards the distal end of the sheath. In this example, the shoulder is chamfered. In this example, a pair of chamfered shoulders 1135 is arranged on the sheath, the chamfered shoulders extending into opposite directions.

During uncoupling, as the male coupling member 1100 is withdrawn from the female coupling member 1200, the sheath 1130 is retained in position by the inner cage 1280. This causes the probe 1110 to move relative to the sheath until the first exit aperture 1122 is shut off by the sheath. This may not, however, ensure that the sheath is located at the distal end of the probe in an extremal position. Suitably, the sheath comprises a wing 1136 arranged to ensure that the sheath is returned to the extremal position when the coupling members are being decoupled.

The wing 1136 may be brought into an extended configuration and into a retracted configuration.

When the wing 1136 is in the extended configuration, the sheath is arranged to resist removal of the sheath until the sheath and the probe have moved relative to each other so that the sheath is located in the extremal position. The wing 1136 is arranged to then move into a retracted configuration in which to enable removal of the sheath along with the probe from the inner cage.

Suitably, the wing 1136 extends from the inner shoulder through an opening formed in the inner shoulder. In this example, the wing is mounted in a channel and extends therefrom. Conveniently, the opening of the channel points into a direction away from the sheath. Thus the profile or cross-sectional size of the sheath may be suitably changed by extending or retracting the wing. Conveniently, in this example the opening of the channel points into a radial direction away from the coupling axis.

When in the extended configuration, the wing 1136 extends from the channel a greater distance than when in the retracted configuration. In some examples, the wing may be retracted completely into the channel.

Accordingly, in the extended configuration the sheath possesses a larger profile than when in the retracted configuration. The sheath will therefore resist removal from the inner cage during uncoupling while the inner cage first engages the inner shoulder and then engages the wing 136. In some examples, the wing causes the sheath to be retained by the inner cage even where the inner cage has fully opened.

Once the sheath has reached its extremal position relative to the probe, the sheath is prevented from remaining in the inner cage. Suitably, the pair of shafts carrying the sheath are arranged to prevent further displacement of the sheath. That is, the shafts are arranged to retain the sheath in the extremal position and prevent the sheath from being removed from the probe. Accordingly, when the sheath is in the extremal position it will be moved along with the probe, because the shafts prevent further relative displacement.

Suitably, when the sheath is in the extremal position, urging the male coupling member to uncouple causes the wing 1136 to retract. That is, the wing is urged to move from the extended configuration to the retracted configuration. During uncoupling, the inner crossbar of the inner cage suitably engages the wing and urges the wing into the retracted configuration.

Conveniently, the wing 1136 is arranged to return to the extended configuration. Any suitable means for biasing the wing may be used. In this example, the wing is sprung. That is, a resiliently deformable biasing member 1137 is arranged to bias the wing. The biasing member may be, for example, a spring such as a helical spring.

In this example, the wing 1136 is pivotally arranged about a wing pivot 1138 defining a pivot axis. Suitably, the biasing member 1137 causes the wing to pivot about the pivot axis. Thereby the biasing member may return the wing to the extended configuration.

With the wing 1136 being biased towards the extended configuration, the wing may catch the inner cage during coupling. This may not, however, cause the sheath 1130 to be moved from its closed position to an open position. Instead, the shaft is suitably arranged to resist displacement of the sheath from the closed position. Only once the sheath abuts the socket a force large enough to overcome the resistance of the shaft so as to move the sheath relative to the probe. Accordingly, the sheath may push past the inner cage on entry, but is arranged to resist moving past the inner cage on exit. The sheath and the inner cage are therefore arranged to act comparable to a door fitted with a latch, in that the door may be shut but the latch will hinder opening of the door once is has been shut.

In some examples, the sheath comprises a plurality of wings 1136. In this example, the sheath comprises a pair of wings arranged on opposite sides, each wing mounted to an inner shoulder 1135.

Figure 16:
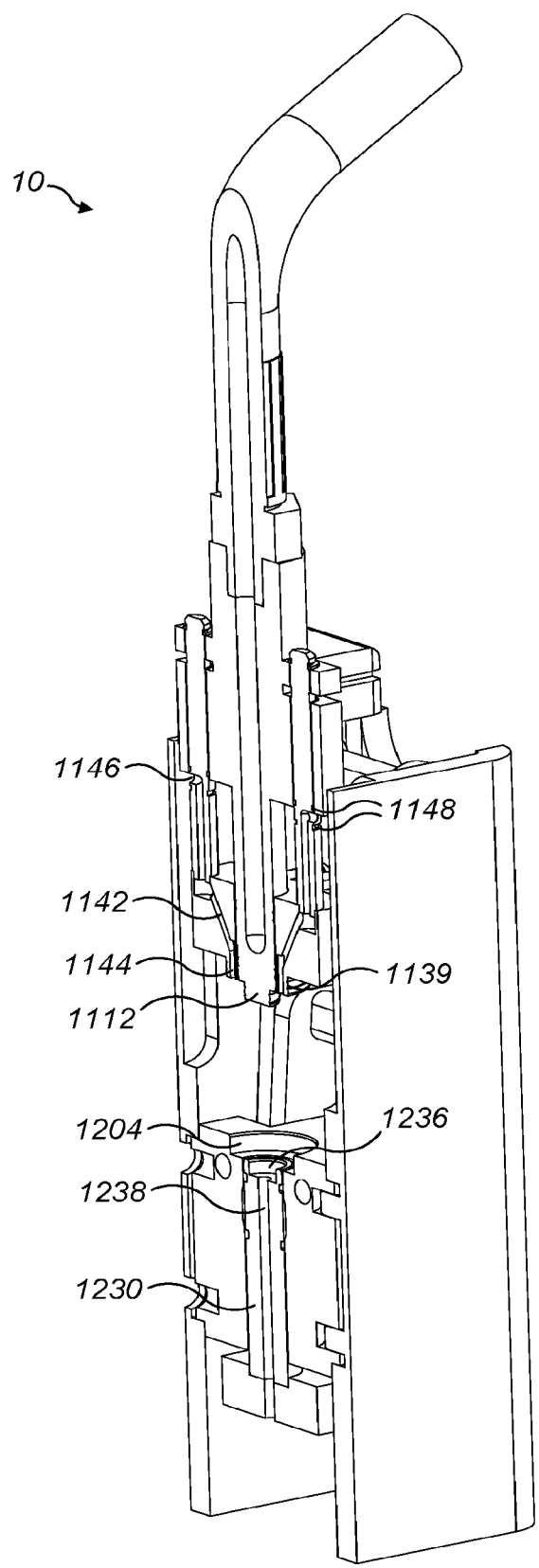
FIG. 16 is a perspective, cut-away top view of a coupling assembly in a partially coupled arrangement.

FIG. 16 is a perspective, cut-away top view of the coupling assembly 10 in a partially coupled arrangement. The male coupling member 1100 is inserted into the female coupling member 1200 with the probe 1110 still separated from the socket 1210. In the partially coupled arrangement, the fluid passageways are not opened.

In this example, the body 1202 of the female coupling member 1200 forms a first recess 1204 in which the socket 1210 is accessed. For coupling, the sheath 1130, which is in its closed position, is inserted into the recess. Suitably, the sheath comprises a sheath projection 1139 arranged to fit into the first recess. In this example, the first recess is annular and, thus, the sheath projection 1139 is annular to fit the first recess and extend about the probe 1110. However, any suitable matching shapes may be chosen and in other examples, different matching shapes are chosen such as oval or polygonal.

The sheath projection 1139 is arranged to form a seal with the first recess 1204. Suitably, the sheath projection forms a groove on an outer face in which an O-ring is carried. Conveniently, the O-ring is arranged to seal the gap between the sheath projection 1139 and the portion of the socket 1210 which forms the first recess.

As the sheath projection 1139 is inserted into the first recess 1204, fluid may be trapped in the first recess. Conveniently, a first drainage aperture is formed in the distal end face of the sheath projection 1139 so that any fluid trapped in the first recess may flow into the first drainage aperture. Suitably, the first drainage aperture connects to a drainage passage 1142 extending through the sheath. The drainage passage extends through the sheath and, in particular, through the shaft 1140 to a second drainage aperture 1146. Utilising the drainage passage, any fluid trapped in the first recess can escape.

The second drainage aperture 1146 may be formed in any portion of the shaft. In this example, the shaft has a generally cylindrical shape and the second drainage aperture is formed by the radial surface of the shaft. That is, the second drainage aperture defines an opening in the shaft which points into a radial direction.

In this example, the second drainage aperture 1146 is located on a section of the shaft 1140 which is open when the sheath 1130 is in its open position. As the sheath is moved towards its closed position, the second drainage aperture is moved inside the passage 150 and sealed. Suitably, a pair of O-ring seals 1148 carried by the shaft and is located about the second drainage aperture. Thus, the O-rings are arranged to seal the second drainage aperture inside the passage. Conveniently, the second drainage aperture is sealed once the first recess 1204 is drained. Suitably, the second drainage aperture is located in the vicinity of the passage when the sheath is in the open position. Thereby leakage from the fluid passageways 1120, 1220 may be reduced and pollution prevented. In this example, a proximal O-ring of the pair of O-rings is located inside the passage when the sheath 1130 is in the closed position.

In some examples, a plurality of drainage channels is formed. In this example a pair of drainage channels is formed, each having a drainage aperture in the sheath projection 1139.

In this example, the piston 1230 forms a second recess 1236. A projection 1112 extending from the distal end of the probe 1110 is arranged to fit into the second recess. In this example, the second recess is circular and, thus, the projection 1112 is arranged circularly to fit the second recess. However, any suitable geometric shape may be chosen and in other examples different matching shapes are chosen.

The projection 1112 is arranged to form a seal with the piston 1230 when inserted into the second recess 1236. In this example, the projection forms a groove in which an O-ring is located. In use, the O-ring seals the gap between the projection and the portion of the piston which forms the second recess 236.

Figure 17:
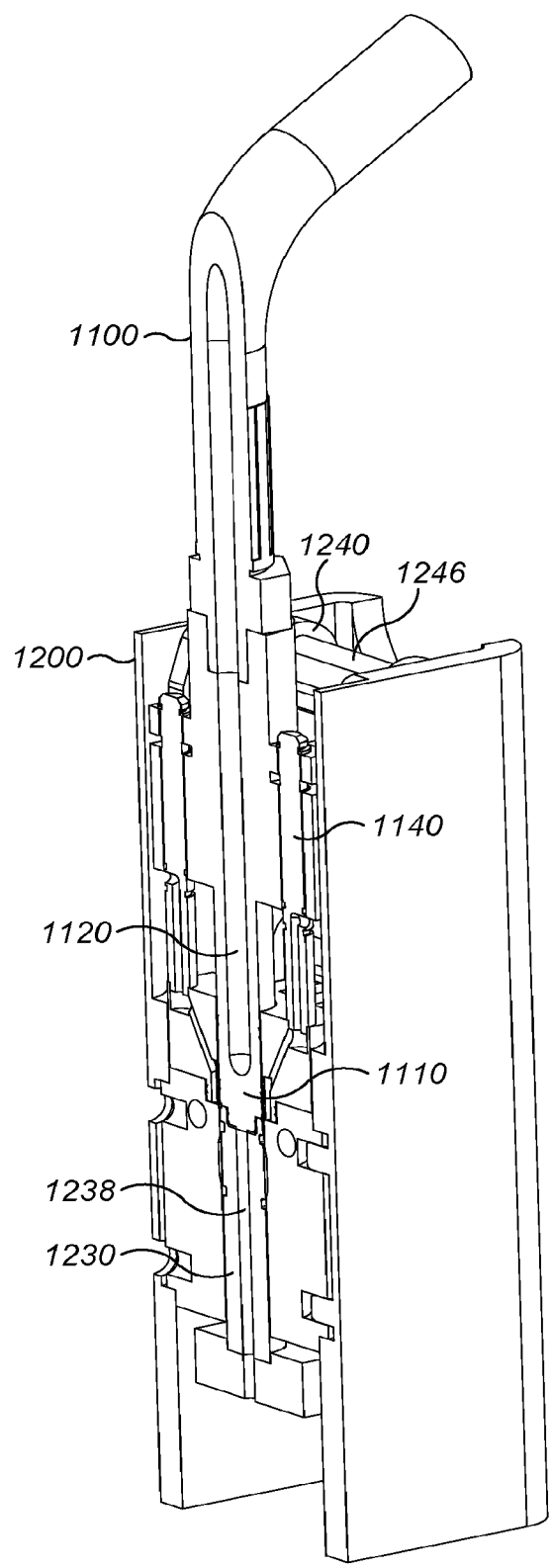
FIG. 17 is a perspective, cut-away top view of a coupling assembly in a partially coupled arrangement.

FIG. 17 is a perspective, cut-away top view of the coupling assembly 10 in a partially coupled arrangement. The male coupling member 1100 has been inserted into the female coupling member 1200, bringing the probe 1110 and the piston 1230 into abutment.

As the probe 1110 is brought into abutment with the piston 1230, fluid may be trapped in the second recess 1236. Conveniently, a second drainage aperture is formed in the second recess 1236. Suitably, the second drainage aperture communicates with a second drainage passage 1238. The second drainage passage extends through the piston 1230. Utilising the second drainage passage, any fluid trapped in the second recess can escape.

Figure 18:
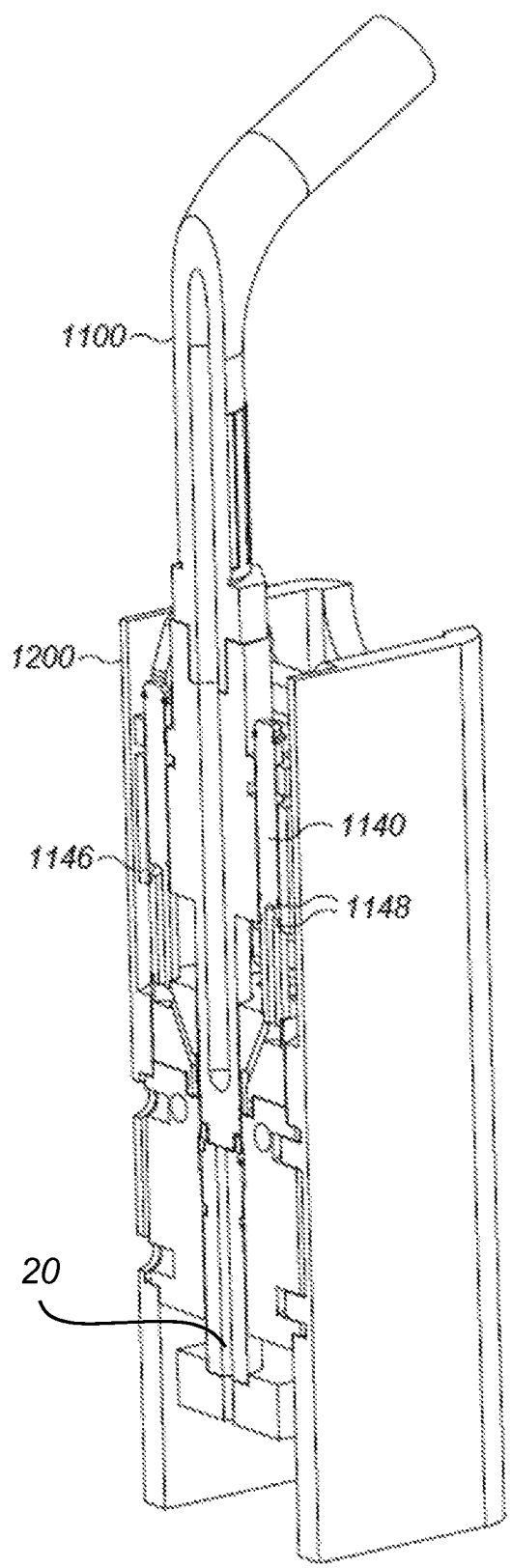
FIG. 18 is a perspective, cut-away top view of a coupling assembly in a partially coupled arrangement.

FIG. 18 is a perspective, cut-away top view of the coupling assembly 10 in a partially coupled arrangement. The probe 1110 has been inserted into the socket 1210, partially displacing the piston 1230.

Figure 20:
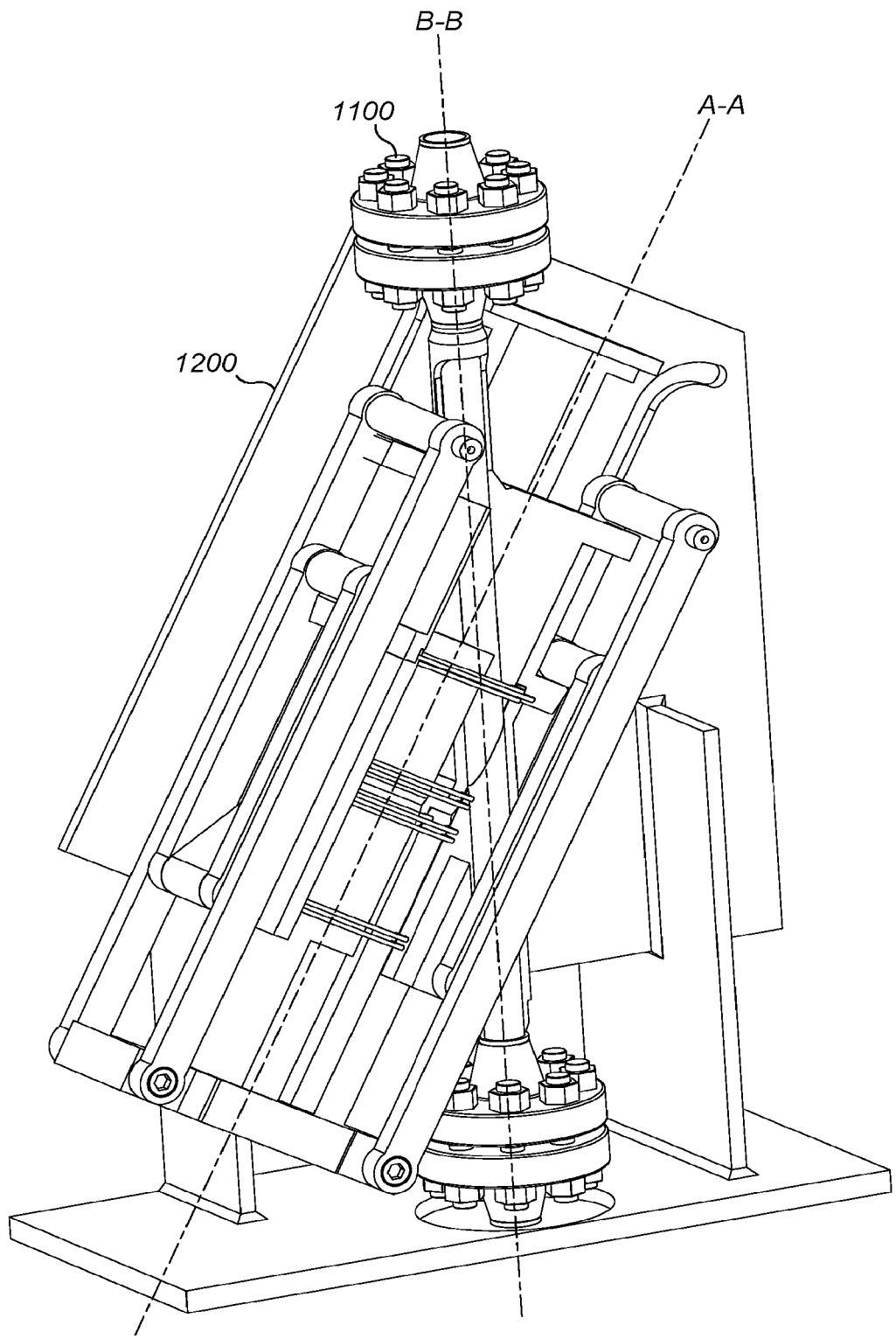
FIG. 20 is a perspective, partially cut-away side view of a coupling assembly in a coupled arrangement.
Figure 21:
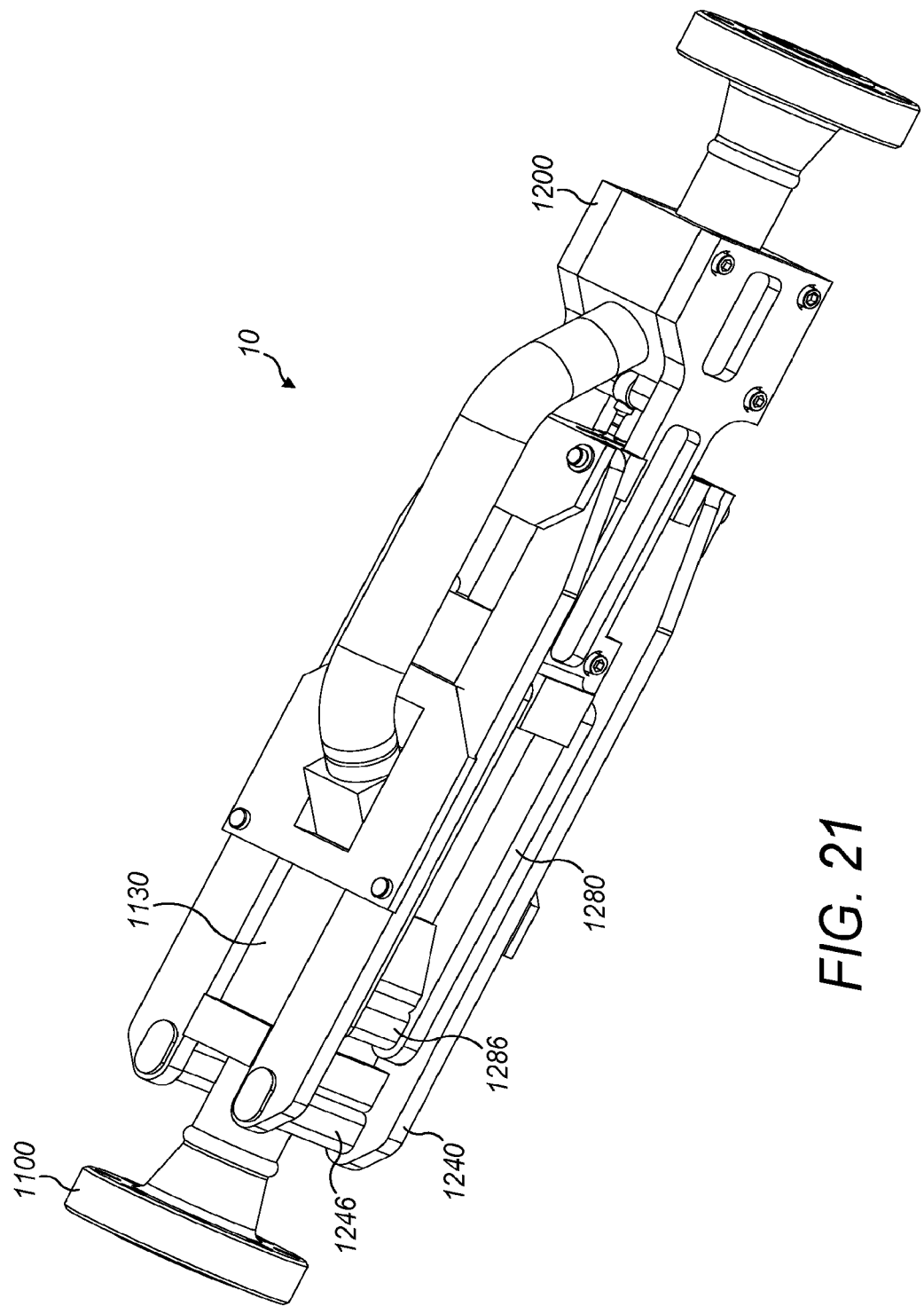
FIG. 21 is a perspective side view of a coupling assembly in a coupled arrangement.

In this example, the male coupling member 1100 and female coupling member 1200 are symmetrical about a plane in which the coupling axis A:A lies, and which is perpendicular to the first pivot axis. FIGS. 20 and 21 illustrate an example coupling assembly 10 where the male coupling member and the female coupling member do not possess this symmetry.

Figure 19:
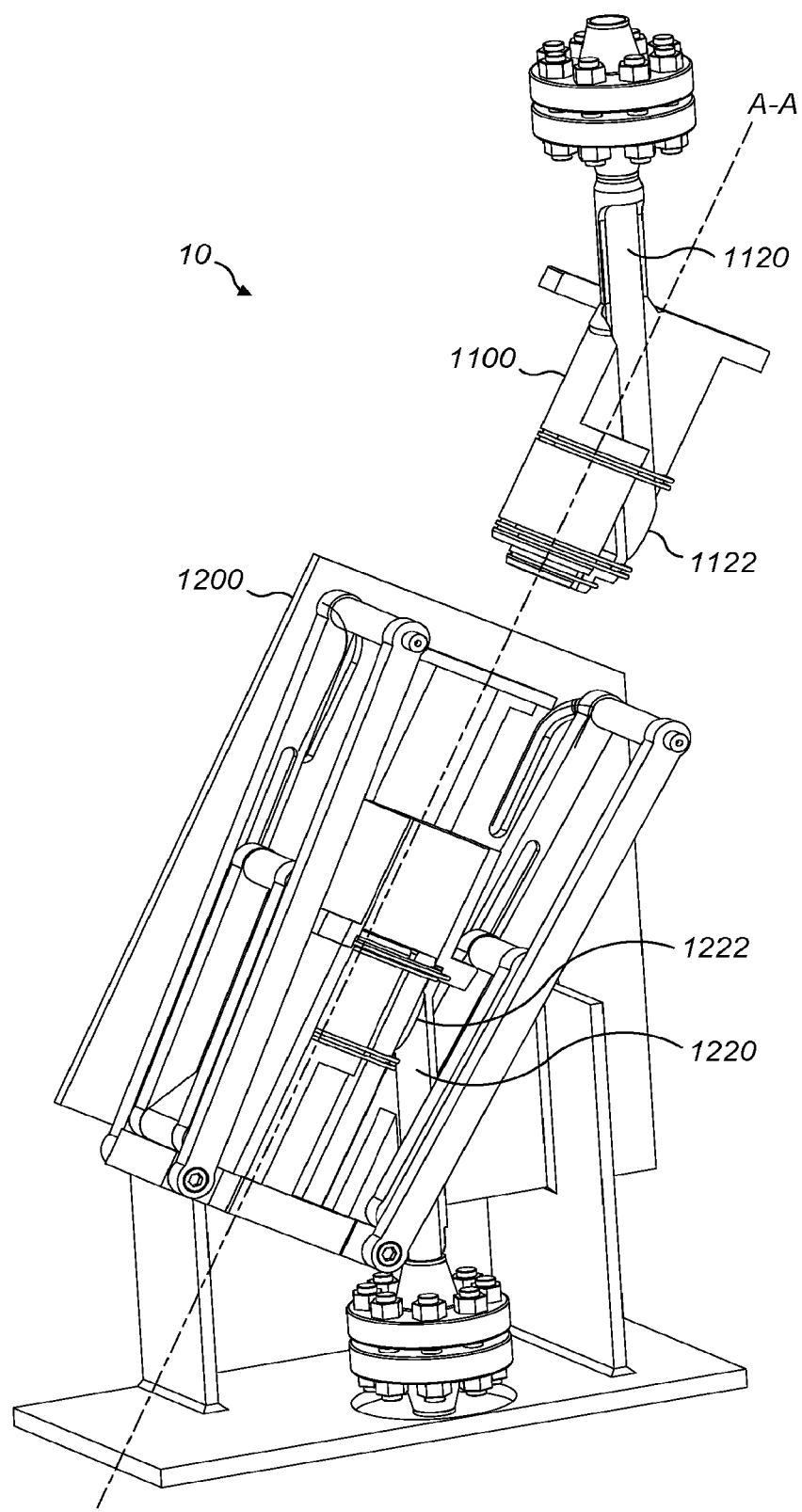
FIG. 19 is a perspective, partially cut-away side view of a coupling assembly in an uncoupled arrangement.

FIGS. 19 and 20 show a partially cut-away perspective view of coupling assembly 10. FIG. 13 shows the coupling assembly in an uncoupled arrangement, while FIG. 20 shows the coupling assembly in a coupled arrangement.

The coupling assembly 10 is generally alike to the coupling assembly discussed with reference to FIGS. 7-18, and a detailed description of features already discussed is therefore omitted.

The coupling assembly 10 includes a male coupling member 1100 with a probe 1110 arranged to couple to a female coupling member 1200 along a coupling axis A:A.

A first fluid passageway 1120 extends through the male coupling member 1100. In this example, the entire first fluid passageway extends at an angle to the coupling axis A:A. Suitably, this angle is larger than 0° (degrees) and smaller than 90°. In some examples, the angle may be between 10° and 60°. In other examples, the angle may lie between 15° and 45°. In yet further examples, the angle may lie between 25° and 35°. By contrast, in the earlier example a section of the first fluid passageway extends collinearly with the coupling axis and smaller section is perpendicular to the coupling axis.

The female coupling member 1200 forms a second fluid passageway 1220. In this example, the second fluid passageway is not arranged collinearly with the coupling axis. The second fluid passageway is arranged so that the first fluid passageway 1120 and the second fluid passageway may be brought into flow communication. Suitably, the second fluid passageway is at an angle to the coupling axis A:A.

In this example, the first and second fluid passageways are substantially straight. Additionally, the first and second fluid passageways are arranged to form a substantially straight combined fluid passageway when the coupling assembly 10 is brought into a coupled arrangement. The combined fluid passageway extends along an axis B:B. Conveniently, a straight fluid passageway may provide for easier access in order to perform inspection or maintenance, for example in the form of 'pigging'. Notably, known 'pigs' may not be able to reach sections of a hose or pipeline which after a bend at a right angle.

In this example, a first track 1250 is formed to have a first section 1252 which is curved and a second section 1254 which is straight. The first section may correspond to a quarter of a circle or ellipse.

Figure 22:
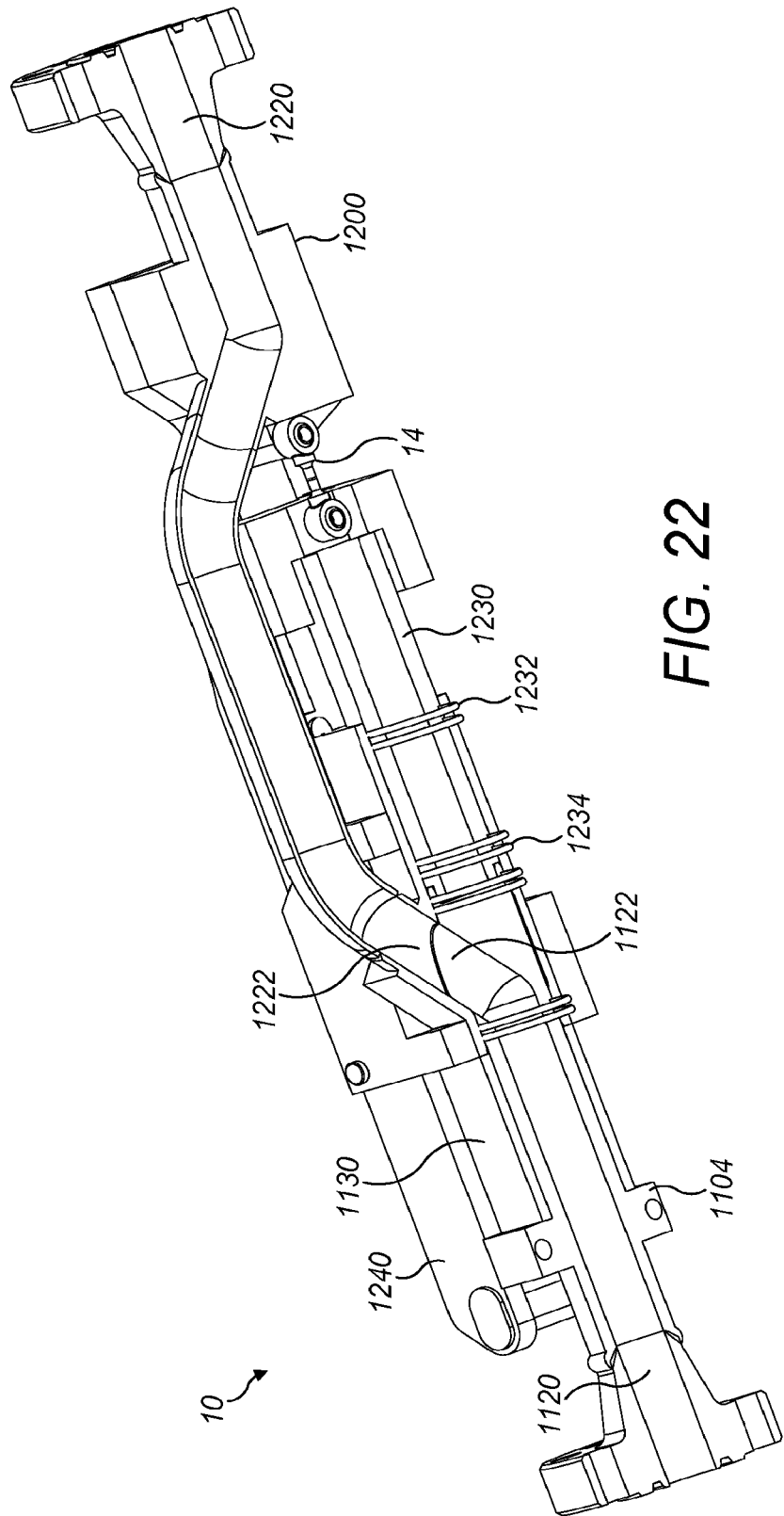
FIG. 22 is a perspective, partially cut-away side view of a coupling assembly in a coupled arrangement.
Figure 23:
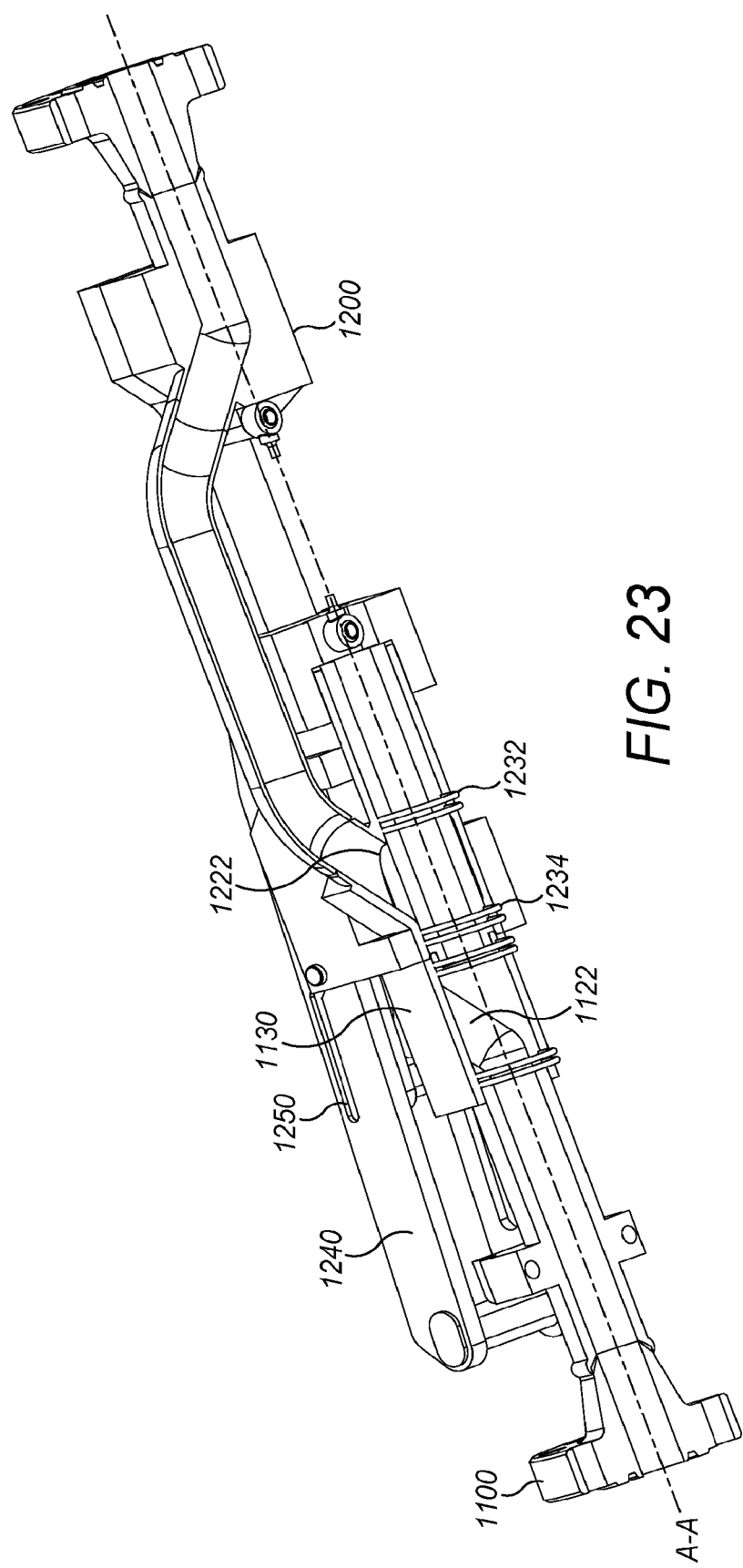
FIG. 23 is a perspective, partially cut-away side view of a coupling assembly in an uncoupled arrangement.

FIGS. 21, 22 and 23 show another example application of a coupling assembly 10.

In this example, the coupling assembly is arranged as a mid line weak link. That is, the coupling assembly 10 is in use positioned midway along a fluid-carrying hose and configured to decouple in an emergency and to automatically shut off fluid flow.

A mid line weak link is arranged to protect personnel and equipment against an uncontrolled uncoupling. Known mind line weak links, however, may be difficult to actuate and may cause substantial fluid loss in the case of a decoupling.

Suitably, the coupling assembly 10 is arranged for improved actuation and reduced fluid loss in the event of a decoupling.

The coupling assembly 10 is generally alike to the coupling assembly discussed with reference to earlier Figures, and a detailed description of features already discussed is therefore omitted.

The coupling assembly 10 comprises a tension pin 14 which is arranged to break in response to an external separation force acting on the coupling assembly, as opposed to separation forces due to pressurised fluid flow inside the coupling assembly. That is, the tension pin is arranged to disconnect when a threshold tension on the coupling assembly is exceeded. In some examples, the tension pin is arranged to break upon the threshold tension being reached. Suitably, the tension pin extends along the coupling axis A:A.

The coupling assembly 10 comprises a male coupling member 1100 and a female coupling member 1200. The male coupling member 100 is received by the female coupling member 1200 and retained against separation forces due to fluid flow inside the coupling assembly by a pair of cages 1240, 1280.

In this example, the outer cage forms a first track 1250 while the follower is formed on the body 1202 of the female coupling member, as opposed to earlier examples where the follower was formed on the cage and the track formed on body. Hence improved compactness of the coupling assembly 10 may be achieved, which may be particularly desirable for a mid line weak link but also outer applications for the coupling assembly.

In this example, the second fluid passageway 1220 runs beside the tension pin 14, extending towards the coupling axis A:A to form a second exit aperture 1222 which may be arranged to be in flow communication with a first exit aperture 1122 of the male coupling member 1100. This arrangement allows the tension pin 14 to extend collinearly with the coupling axis, thus improving the tension pin's response to external separation forces.

Notably, as the tension pin breaks and the coupling assembly uncouples, a sheath 1130 closes the first exit aperture 1122 of the male coupling assembly and a piston 1230 closes the second exit aperture 1222 of the female coupling member. Thereby loss of fluid in the event of a breaking may be minimised and pollution prevented.

In summary, exemplary embodiments of a valve assembly have been described. The described exemplary embodiments provide for an improved assembly. At least some of the following example embodiments provide an improved valve assembly. The example devices are durable and arranged to withstand repeated coupling and uncoupling. The example devices are arranged for reduced fluid loss when coupling and uncoupling. The example devices are easy to actuate and particularly suitable for actuation through robots.

Although a few preferred embodiments have been shown and described, it will be appreciated by those skilled in the art that various changes and modifications might be made without departing from the scope of the invention, as defined in the appended claims.

The invention claimed is:

1. A valve assembly comprising:
a probe having a first fluid exit;
a socket for receiving the probe and having a second fluid exit;
wherein the probe and socket are moveable along a coupling axis to open and close the valve assembly;
the valve assembly further comprising
a closing member arranged relative to one or the other of the first and second fluid exits and and adapted to move between an open position and a closed position, wherein in the open position, the closing member does not obstruct said fluid exit and in the closed position, the closing member seals said exit, and
a securing means is arranged to secure and release the closing member relative to the probe or socket of the other exit;
characterised in that
the movement of the securing means is controlled by a cam and follower arrangement, wherein the securing means is connected to a common pivot axis at two spaced pivot locations across the pivot axis, and two arms extend from the two spaced pivot locations to a catch for securing the closing member, the catch extending parallel to the pivot axis and between the two arms, each arm includes a follower for following a cam to control the movement of the catch, and further wherein the closing member is a movable valve member for selectively obstructing one or the other of the first and second fluid exits.

2. The valve assembly of claim 1, wherein the closing member is arranged to close the socket and the securing means is pivotally attached to the closing member and arranged to secure and release the probe.

3. The valve assembly of claim 1, wherein the closing member is arranged to close the probe and the securing means is pivotally attached to the socket and arranged to secure and release the closing member.

4. The valve assembly of claim 1, the two arms are arranged to pivot towards each other in order to secure the closing member.

5. The valve assembly of claim 1 wherein the valve includes a second closing member for opening and closing one of the exits, and a second securing means for securing and releasing the second closing member, and further wherein the second closing member is a movable valve member for selectively obstructing one or the other of the first and second fluid exits.

6. The valve assembly of claim 5, wherein the second securing means is linked to the first securing means, such that the first and second securing means are constrained to pivot together, the securing members being linked in a sliding manner such that pivot points of the first and second securing means can move relative to each other along the coupling axis.

7. The valve assembly of claim 1, wherein the closing member is retained in position relative to the socket or probe by a retaining means and the retaining means is biased to retain the closing member in place relative to said socket or probe until a force is applied to urge the closing member to move relative to said socket or probe that overcomes the bias provided by the retaining means.

8. A valve assembly comprising:
   (a) a male member including a probe having a first fluid exit;
   (b) a female member including:
      (i) a socket for receiving the probe, the socket having a second fluid exit and a pair of arms that are arranged to pivot towards each other for securing and releasing a closing member arranged relative to either the second fluid exit of the socket or the first fluid exit on the probe for moving the closing member between an open position and a closed position, and
      (ii) wherein in the open position, the closing member does not obstruct said fluid exit and in the closed position, the closing member seals said exit; and
   wherein a slot on the socket cooperates with the male member for controlling movement of the pair of arms as the probe is inserted into the socket,
   wherein the pair of arms are connected to a common pivot axis at two spaced pivot locations across the pivot axis, and the pair of arms extend from the two spaced pivot locations to a catch for securing the closing member, the catch extending parallel to the pivot axis and between the pair of arms, each arm includes a follower for following a cam to control the movement of the catch; and further wherein the closing member is a movable valve member for selectively obstructing one or the other of the first and second fluid exits.

9. The valve assembly of claim 8, wherein the closing member is arranged to close the socket and the pair of arms are pivotally attached to the closing member and arranged to secure and release the probe.

10. The valve assembly of claim 8, wherein closing member is arranged to close the probe and the pair of arms are pivotally attached to the socket and arranged to secure and release the closing member.

11. The valve assembly of claim 8, wherein the valve includes a second closing member for opening and closing one of the exits, and a second pair of arms for securing and releasing the second closing member, and further wherein the second closing member is a movable valve member for selectively obstructing one or the other of the first and second fluid exits.

12. The valve assembly of claim 11, wherein the second pair of arms are linked to the first pair of arms, such that the first and second pair of arms are constrained to pivot together being linked in a sliding manner such that pivot points of the first and second pair of arms can move relative to each other along the coupling axis.

* * * * *